United States Patent
Mehra et al.

(10) Patent No.: US 10,459,644 B2
(45) Date of Patent: Oct. 29, 2019

(54) NON-VOLATILE STORAGE SYSTEM WITH INTEGRATED COMPUTE ENGINE AND OPTIMIZED USE OF LOCAL FAST MEMORY

(71) Applicant: Western Digital Technologies, Inc., San Jose, CA (US)

(72) Inventors: Pankaj Mehra, San Jose, CA (US); Vidyabhushan Mohan, San Jose, CA (US)

(73) Assignee: Western Digital Techologies, Inc., San Jose, CA (US)

( * ) Notice: Subject to any disclaimer, the term of this patent is extended or adjusted under 35 U.S.C. 154(b) by 77 days.

(21) Appl. No.: 15/726,903

(22) Filed: Oct. 6, 2017

(65) Prior Publication Data
US 2018/0121121 A1    May 3, 2018

Related U.S. Application Data

(60) Provisional application No. 62/414,608, filed on Oct. 28, 2016.

(51) Int. Cl.
| G06F 12/00 | (2006.01) |
| G06F 3/06 | (2006.01) |
| G06F 12/06 | (2006.01) |
| G06F 12/10 | (2016.01) |
| G06F 12/02 | (2006.01) |

(52) U.S. Cl.
CPC .......... G06F 3/0631 (2013.01); G06F 3/061 (2013.01); G06F 3/0604 (2013.01);
(Continued)

(58) Field of Classification Search
CPC .... G06F 3/0631; G06F 3/0604; G06F 3/0679; G06F 12/0246; G06F 12/0692; G06F 12/10; G06F 2212/1044; G06F 2212/657; G06F 2212/7207
See application file for complete search history.

(56) References Cited

U.S. PATENT DOCUMENTS

| 6,401,185 B1 | 6/2002 | Sexton |
| 6,446,062 B1 | 9/2002 | Levine |

(Continued)

OTHER PUBLICATIONS

PCT International Search Report dated Dec. 15, 2017, PCT Patent Application No. PCT/US2017/055963.

(Continued)

*Primary Examiner* — David Yi
*Assistant Examiner* — Tahilba O Puche
(74) *Attorney, Agent, or Firm* — Vierra Magen Marcus LLP

(57) ABSTRACT

A memory system (e.g. a solid state drive) includes one or more non-volatile memory die, a controller in communication with the memory die, a local memory connected to (or part of) the controller and a compute engine inside the memory system that is near the location of the data and can be used to perform common data manipulation operations. When the memory system receives instructions to use the compute engine to perform data manipulation operations, the local memory is reallocated such that an amount of space allocated in the local memory for logical to physical translation information is changed based on the one or more data manipulation instructions.

19 Claims, 27 Drawing Sheets

| Local Memory 2023 |
|---|
| Address Translations Tables/Cache 2102-1 |
| Read Buffer 2014 |
| Write Buffer 2106 |
| ⋮ |

Normal Operation Mode

| Local Memory 2023 |
|---|
| Retained Address Translations Entries 2102-2 |
| Data Manipulation Instructions 2108 |
| Working Memory for Data Manipulation Instructions 2110 |
| Data Manipulation Results 2112 |

Data Manipulation Mode

(52) U.S. Cl.
CPC .......... *G06F 3/0656* (2013.01); *G06F 3/0679* (2013.01); *G06F 12/0246* (2013.01); *G06F 12/0692* (2013.01); *G06F 12/10* (2013.01); G06F 2212/1044 (2013.01); G06F 2212/657 (2013.01); G06F 2212/7201 (2013.01); G06F 2212/7207 (2013.01)

(56) References Cited

U.S. PATENT DOCUMENTS

| | | | |
|---|---|---|---|
| 6,549,977 B1 | 4/2003 | Horst | |
| 6,856,556 B1 | 2/2005 | Hajeck | |
| 7,055,015 B2 | 5/2006 | Shiota | |
| 7,126,857 B2 | 10/2006 | Hajeck | |
| 7,424,478 B2 | 9/2008 | Licon | |
| 7,430,136 B2 | 9/2008 | Merry, Jr. | |
| 7,447,807 B1 | 11/2008 | Merry | |
| 7,502,256 B2 | 3/2009 | Merry, Jr. | |
| 7,509,441 B1 | 3/2009 | Merry | |
| 7,596,643 B2 | 9/2009 | Merry, Jr. | |
| 7,653,778 B2 | 1/2010 | Merry, Jr. | |
| 7,685,337 B2 | 3/2010 | Merry, Jr. | |
| 7,685,338 B2 | 3/2010 | Merry, Jr. | |
| 7,685,374 B2 | 3/2010 | Diggs | |
| 7,733,712 B1 | 6/2010 | Walston | |
| 7,765,373 B1 | 7/2010 | Merry | |
| 7,774,575 B2 | 8/2010 | Seto | |
| 7,898,855 B2 | 3/2011 | Merry, Jr. | |
| 7,912,991 B1 | 3/2011 | Merry | |
| 7,936,603 B2 | 5/2011 | Merry, Jr. | |
| 7,962,792 B2 | 6/2011 | Diggs | |
| 8,078,918 B2 | 12/2011 | Diggs | |
| 8,090,899 B1 | 1/2012 | Syu | |
| 8,095,851 B2 | 1/2012 | Diggs | |
| 8,108,692 B1 | 1/2012 | Merry | |
| 8,122,185 B2 | 2/2012 | Merry, Jr. | |
| 8,127,048 B1 | 2/2012 | Merry | |
| 8,135,903 B1 | 3/2012 | Kan | |
| 8,151,020 B2 | 4/2012 | Merry, Jr. | |
| 8,161,227 B1 | 4/2012 | Diggs | |
| 8,166,245 B2 | 4/2012 | Diggs | |
| 8,243,525 B1 | 8/2012 | Kan | |
| 8,254,172 B1 | 8/2012 | Kan | |
| 8,255,661 B2 | 8/2012 | Karr | |
| 8,261,012 B2 | 9/2012 | Kan | |
| 8,296,625 B2 | 10/2012 | Diggs | |
| 8,312,207 B2 | 11/2012 | Merry, Jr. | |
| 8,316,176 B1 | 11/2012 | Phan | |
| 8,341,339 B1 | 12/2012 | Boyle | |
| 8,370,602 B2 | 2/2013 | Chen | |
| 8,375,151 B1 | 2/2013 | Kan | |
| 8,392,635 B2 | 3/2013 | Booth | |
| 8,397,107 B1 | 3/2013 | Syu | |
| 8,407,449 B1 | 3/2013 | Colon | |
| 8,423,722 B1 | 4/2013 | Deforest | |
| 8,433,858 B1 | 4/2013 | Diggs | |
| 8,443,167 B1 | 5/2013 | Fallone | |
| 8,447,920 B1 | 5/2013 | Syu | |
| 8,458,435 B1 | 6/2013 | Rainey, III | |
| 8,478,930 B1 | 7/2013 | Syu | |
| 8,489,854 B1 | 7/2013 | Colon | |
| 8,503,237 B1 | 8/2013 | Horn | |
| 8,521,972 B1 | 8/2013 | Boyle | |
| 8,549,236 B2 | 10/2013 | Diggs | |
| 8,583,835 B1 | 11/2013 | Kan | |
| 8,601,311 B2 | 12/2013 | Horn | |
| 8,601,313 B1 | 12/2013 | Horn | |
| 8,612,669 B1 | 12/2013 | Syu | |
| 8,612,804 B1 | 12/2013 | Kang | |
| 8,615,681 B2 | 12/2013 | Horn | |
| 8,634,247 B1 | 1/2014 | Sprouse | |
| 8,638,602 B1 | 1/2014 | Horn | |
| 8,639,872 B1 | 1/2014 | Boyle | |
| 8,683,113 B2 | 3/2014 | Abasto | |
| 8,700,834 B2 | 4/2014 | Horn | |
| 8,700,950 B1 | 4/2014 | Syu | |
| 8,700,951 B1 | 4/2014 | Call | |
| 8,706,985 B1 | 4/2014 | Boyle | |
| 8,707,104 B1 | 4/2014 | Jean | |
| 8,713,066 B1 | 4/2014 | Lo | |
| 8,713,357 B1 | 4/2014 | Jean | |
| 8,719,531 B2 | 5/2014 | Strange | |
| 8,724,422 B1 | 5/2014 | Agness | |
| 8,725,931 B1 | 5/2014 | Kang | |
| 8,738,860 B1* | 5/2014 | Griffin | G06F 12/0897 711/122 |
| 8,745,277 B2 | 6/2014 | Kan | |
| 8,751,728 B1 | 6/2014 | Syu | |
| 8,769,190 B1 | 7/2014 | Syu | |
| 8,769,232 B2 | 7/2014 | Suryabudi | |
| 8,773,909 B2 | 7/2014 | Li | |
| 8,775,720 B1 | 7/2014 | Meyer | |
| 8,780,632 B2 | 7/2014 | Sprouse | |
| 8,780,634 B2 | 7/2014 | Li | |
| 8,782,327 B1 | 7/2014 | Kang | |
| 8,788,778 B1 | 7/2014 | Boyle | |
| 8,788,779 B1 | 7/2014 | Horn | |
| 8,788,880 B1 | 7/2014 | Gosla | |
| 8,793,429 B1 | 7/2014 | Call | |
| 8,817,541 B2 | 8/2014 | Li | |
| 8,838,936 B1 | 9/2014 | Salessi | |
| 8,949,568 B2 | 2/2015 | Wei | |
| 9,330,143 B2 | 5/2016 | Obukhov | |
| 9,348,758 B2 | 5/2016 | Pignatelli | |
| 2002/0116457 A1 | 8/2002 | Eshleman | |
| 2002/0178328 A1 | 11/2002 | Honda | |
| 2004/0225831 A1 | 11/2004 | Pail | |
| 2006/0143238 A1 | 6/2006 | Tamatsu | |
| 2007/0204128 A1 | 8/2007 | Lee | |
| 2008/0071785 A1 | 3/2008 | Kabra | |
| 2008/0140918 A1 | 6/2008 | Sutardja | |
| 2009/0138654 A1 | 5/2009 | Sutardja | |
| 2009/0288101 A1 | 11/2009 | Gandin | |
| 2010/0174849 A1 | 7/2010 | Walston | |
| 2010/0250793 A1 | 9/2010 | Suy | |
| 2011/0099323 A1 | 4/2011 | Syu | |
| 2011/0283048 A1 | 11/2011 | Feldman | |
| 2011/0283049 A1 | 11/2011 | Kang | |
| 2011/0296440 A1 | 12/2011 | Laurich | |
| 2012/0179869 A1 | 7/2012 | Flynn | |
| 2012/0221534 A1 | 8/2012 | Gao | |
| 2012/0260020 A1 | 10/2012 | Suryabudi | |
| 2012/0278531 A1 | 11/2012 | Horn | |
| 2012/0284460 A1 | 11/2012 | Guda | |
| 2012/0324191 A1 | 12/2012 | Strange | |
| 2013/0132638 A1 | 5/2013 | Horn | |
| 2013/0145106 A1 | 6/2013 | Kan | |
| 2013/0173850 A1 | 7/2013 | Song | |
| 2013/0290793 A1 | 10/2013 | Booth | |
| 2014/0059405 A1 | 2/2014 | Syu | |
| 2014/0082323 A1 | 3/2014 | Li | |
| 2014/0101369 A1 | 4/2014 | Tomlin | |
| 2014/0108703 A1* | 4/2014 | Cohen | G06F 3/0616 711/103 |
| 2014/0115427 A1 | 4/2014 | Lu | |
| 2014/0133220 A1 | 5/2014 | Danilak | |
| 2014/0136753 A1 | 5/2014 | Tomlin | |
| 2014/0149826 A1 | 5/2014 | Lu | |
| 2014/0157078 A1 | 6/2014 | Danilak | |
| 2014/0181432 A1 | 6/2014 | Horn | |
| 2014/0215129 A1 | 7/2014 | Kuzmin | |
| 2014/0223255 A1 | 8/2014 | Lu | |
| 2014/0281228 A1* | 9/2014 | O'Broin | G06F 3/061 711/118 |
| 2015/0074371 A1 | 3/2015 | Hashimoto | |
| 2016/0170878 A1* | 6/2016 | Trika | G06F 12/0871 711/118 |
| 2017/0177497 A1 | 6/2017 | Chun | |

OTHER PUBLICATIONS

PCT Written Opinion of the International Searching Authoritydated Dec. 15, 2017, PCT Patent Application No. PCT/US2017/055963.

(56) References Cited

OTHER PUBLICATIONS

International Search Report and Written Opinion dated Jan. 27, 2015, PCT Serial No. PCT/US2014/062066, 9 pages.

Sungchan Kim, et al., "Fast, Energy Efficient Scan inside Flash Memory SSDs," The Second International Workshop on Accelerating Data Management Systems using Modern Processor and Storage Architecture (ADMS' 11), 2011, pp. 1-8.

De, et al., "Minerva: Accelerating Data Analysis in Next-Generation SSDs," FCCM '13 Proceedings of the 2013 IEEE 21st Annual International Symposium on Field-Programmable Custom Computing Machines, pp. 9-16, Apr. 28-30, 2013.

Ki, "In-Storage Compute: an Ultimate Solution for Accelerating I/O-intensive Applications," Samsung Electronics, Aug. 13, 2015.

Tiwari, et al., "Active Flash: Towards Energy-Efficient, In-Situ Data Analytics on Extreme-Scale Machines," FAST'13 Proceedings of the 11th USENIX conference on File and Storage Technologies, pp. 119-132, San Jose, CA, Feb. 12-15, 2013.

Tseng, et al., "Morpheus: Creating Application Objects Efficiently for Heterogeneous Computing," ISCA '16 Proceedings of the 43rd International Symposium on Computer Architecture, pp. 53-65, Seoul, Republic of Korea, Jun. 18-22, 2016.

Park, et al., "CFTL: An Adaptive Hybrid Flash Translation Layer with Efficient Caching Strategies," IEEE Transaction on Computers, Sep. 2011.

Lee, et al., "A Case for Flash Memory SSD in Enterprise Database Applications," Proceedings of the 2008 ACM SIGMOD international conference on Management of data, pp. 1075-1086, Jun. 9-12, 2008.

* cited by examiner

Device-Based FTL Implementation

Host-Based FTL Implementation

NON-VOLATILE STORAGE SYSTEM WITH INTEGRATED COMPUTE ENGINE AND OPTIMIZED USE OF LOCAL FAST MEMORY

This application claims the benefit of U.S. Provisional Application 62/414,608, "Methods to Optimize Use of Limited Fast Memory Capacity in Storage Devices with Integrated Compute Module," filed on Oct. 28, 2016.

BACKGROUND

Non-volatile semiconductor memory is used in solid state drives (SSD). As Internet-scale services continue to grow, real time data processing and data analytics by ad-hoc queries on large volumes of data is emerging as a critical application. Additionally, as memory density continues to scale, SSD capacities continue to scale exponentially. Current enterprise systems are ill-equipped to manage these trends as they rely on moving huge volumes of data out of the SSD and into a host system's main memory for processing. These solutions rely on storing data at one location (i.e. a storage device like a SSD) and move data to a different location (typically DRAM of the host) for computation. While this method works for some applications with limited data sizes, applications with large scale data cannot use this method because of the time wasted on transferring data and the prohibitively high cost and power consumption of including large scale (e.g. petabyte) DRAM capacity in such systems.

BRIEF DESCRIPTION OF THE DRAWINGS

Like-numbered elements refer to common components in the different figures.

DETAILED DESCRIPTION

Figure 1:
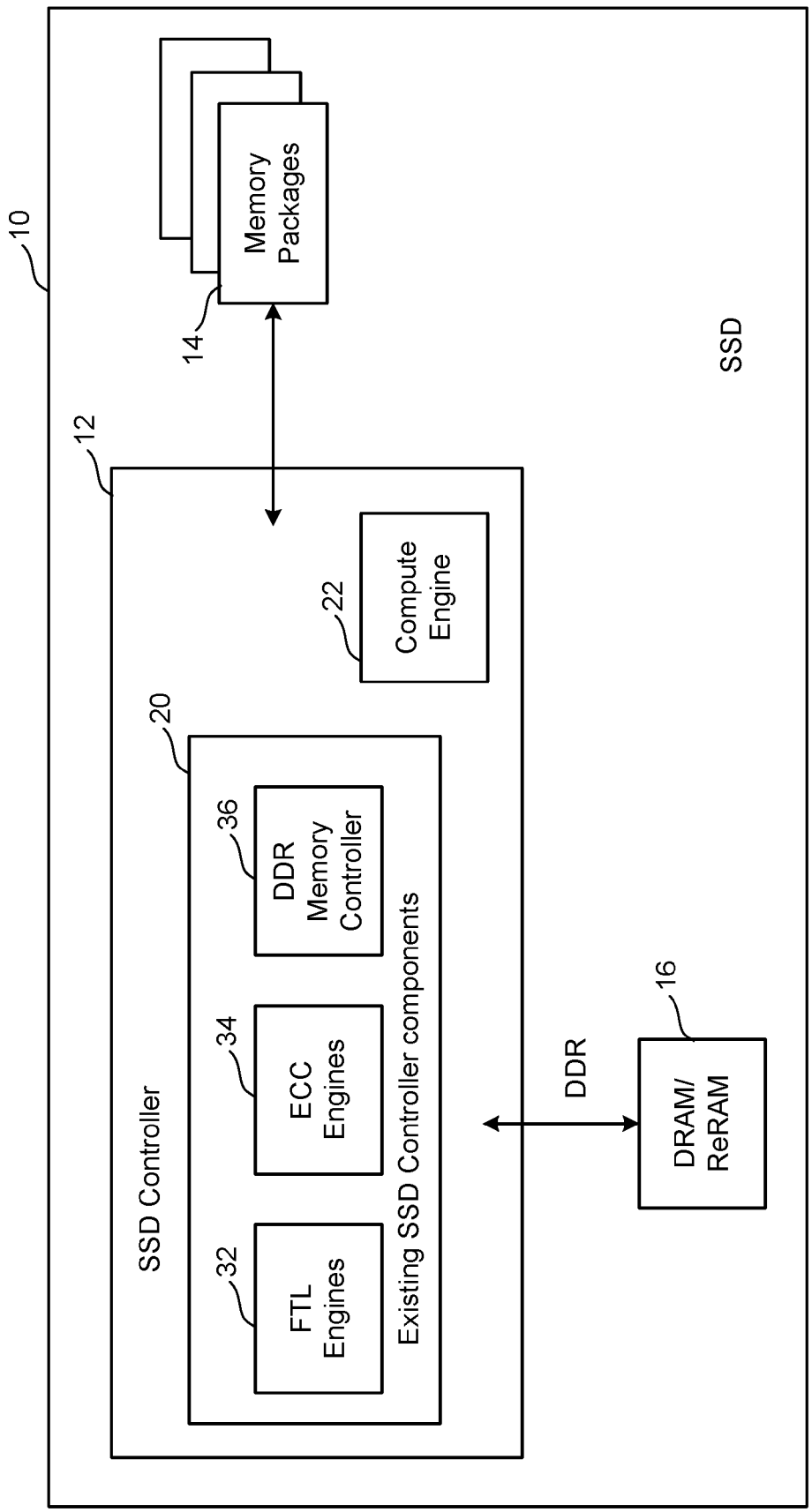
FIG. 1 is a block diagram of one embodiment of a solid state drive that comprises a Controller, non-volatile memory for storing data and a compute engine near the location of the data that can be used to perform common data manipulation operations.

A solid state drive ("SSD"), or other memory system, is proposed that can accelerate performance of big data applications using a hardware accelerator based approach that involves integrating compute engines inside the SSD (or other memory system) to perform common data manipulation operations such as scan, filter, aggregate, and join (and other operations). Application Programming Interfaces ("APIs") can be exposed by the memory system (e.g., exposed by the Controller) and used by the host application to perform efficient data processing using the compute engines in the SSD or other memory system.

As the compute operations move closer to the data, the available compute-to-data bandwidth increases significantly. For example, compared to conventional systems where compute is located on the host side of the I/O interface (and outside the SSD), integrating the compute engine within a SSD can provide 1.5×-3.75× higher bandwidth, even as NAND architecture and I/O interfaces continue to scale. Similarly, even closer integration with the bits—by moving the compute engine within a memory die—can provide an additional 2.5×-13× increase in bandwidth available to the compute engine in future generations of NAND memory, assuming the adoption of advanced packaging techniques.

A compute engine is a hardware circuit that can be one or more of the following:

1. Hardware accelerator for data access and manipulation operations such as filtering, aggregation, compression/decompression, sorting, grouping, and joining tabular or other forms of data;

2. General purpose CPU core such as ARM/ARC/Intel Atom; and/or

3. Reconfigurable hardware circuitry such as FPGAs.

Unlike other components in an SSD that primarily facilitate reading/writing data from/to the SSD, a compute engine manipulates the contents of the data. For example, it can search a stream of data looking for a specific key (a set of bytes) or can sort the data in some order as specified by the host. The concept of compute engines includes but is not limited to compression/decompression engines sometimes available in SSDs.

Typical memory systems include a controller, non-volatile storage connected to the controller, and local high speed volatile memory (e.g., DRAM) connected to and local to the controller. The controller can use the local high speed volatile memory (also referred to as local memory) as a read buffer, as a write buffer, as a scratch pad and to store logical address to physical address translation tables ("L2P tables").

In many systems, the non-volatile storage is addressed internally to the memory system using physical addresses associated with the one or more memory die. However, the host system will use logical addresses to address the various memory locations. This enables the host to assign data to consecutive logical addresses, while the memory system is free to store the data as it wishes among the locations of the one or more memory die. To enable this system, the controller performs address translation between the logical addresses used by the host and the physical addresses used by the memory die. One example implementation is to maintain tables (ie the L2P tables mentioned above) that identify the current translation between logical addresses (such as logical block addresses, known as LBA's) and physical addresses (such as physical block addresses, known as PBA's). An entry in the L2P table may include an identification of a LBA and corresponding PBA.

In some examples, the memory space of a memory system is so large that the local memory cannot hold all of the L2P tables. In such a case, the entire set of L2P tables are stored in the non-volatile storage and a subset of the L2P tables are cached (L2P cache) in the local memory. The bigger the L2P cache, the higher performance of the memory system. In some memory systems, the L2P cache may utilize up to 95% of the local memory. Using such a large portion of the local memory is not a problem during normal operation of the memory system (e.g., during programming, erasing and reading). However, when the local compute engine (discussed above) has been engaged to perform data manipulation operations, that local compute engine needs to use a portion of the local memory as working memory to support the data manipulation operations. If 95% of the local memory is reserved for the L2P cache, then there will not be enough free memory for the compute engine and the compute engine's performance will suffer. Therefore, there is a need to reduce the amount of space (capacity) in the local memory that is reserved for the L2P cache when the local memory is needed by a compute engine, without degrading performance of the memory system.

To address this need, a non-volatile storage system is proposed that comprises a controller, local memory in communication with the controller, non-volatile memory in communication with the controller, and a compute engine in communication with the controller and the local memory. The compute engine is configured to receive (e.g., directly or via a controller) one or more data manipulation instructions from an entity external to the non-volatile storage system (e.g., a host) and perform one or more data manipulation operations, using the local memory, on data stored in the non-volatile memory in response to (and according to) the one or more data manipulation instructions. When the non-volatile storage system (e.g., the compute engine) is performing the one or more data manipulation operations, the amount of space allocated in the local memory for logical to physical translation information (e.g., L2P tables) is changed based on the one or more data manipulation instructions. In one example embodiment, the amount of space allocated in the local memory for logical to physical translation information is changed by reducing space in the local memory allocated to logical to physical translation information by removing logical to physical translation information from the local memory for logical addresses not accessed by the one or more data manipulation instructions. In another embodiment, the amount of space allocated in the local memory for logical to physical translation information is changed by adding (to a local memory with no or little L2P cache) portions of a L2P cache received from the entity external to the non-volatile storage system (e.g., the host).

FIGS. 1-19 describe various architectures for memory systems that can implement the technology proposed herein. For example, FIG. 1 is a block diagram of one embodiment of SSD 10 that comprises a Controller (SSD Controller) 12, non-volatile memory packages 14 for storing data, DRAM/ReRAM 16, and a compute engine 22 near the location of the data that can be used to perform common data manipulation operations. FIG. 1 presents a high-level design where the compute engine 22 is integrated within the SSD Controller 12. The compute engine 22 can be, for instance, an ASIC that is part of the SSD Controller system on a chip ("SoC"), or can be integrated (deeper) as a hardware circuit within the SSD controller. FIG. 1 shows the SSD Controller 12, a SoC, including existing SSD Controller components that comprise FTL engines 32, ECC engines 34, and DDR memory controller 36 for controlling DRAM/ReRAM 16. Included within that SSD Controller 12 is the new proposed compute engine 22 that can be used to perform compute operations on data stored in the non-volatile memory of the memory packages. Examples of the compute operations include scanning the data, searching, filtering, sorting, aggregating data, joining data together, as well as other functions on the data. FIG. 1 shows the SSD Controller 12 in communication with DRAM/ReRAM 16 and in communication with the set of one or more memory packages 14. In one embodiment, the SSD Controller 12 communicates with the memory packages (and/or memory die) using a Toggle Mode interface, which is an asynchronous interface that is able to communicate 32 GB/s. An alternative embodiment could use ONFI interface (Open NAND Flash Interface), which is synchronous and makes use of a clock. DRAM/ReRAM 16 is one example of a local memory (e.g., high speed volatile memory).

In the designs considered below, a memory package refers to a structure that contains one or more memory dies (e.g., NAND flash memory dies, ReRAM dies, both NAND and ReRAM, or other non-volatile technologies). The term memory package can also refer to managed memory—i.e. a memory package that contains one or more memory dies with an embedded error correction code ("ECC") engine/controller to correct errors detected during read operations to the memory.

The memory packages include one or more memory die. In one embodiment, each memory die will include its own chip enable that can be controlled by SSD Controller 12. In other embodiments, multiple memory die may share a chip enable, requiring SSD Controller 12 to use addressing to select between the memory die that share a chip enable. In one embodiment, the memory die in the memory packages 14 utilize NAND flash memory. In other embodiments, the memory package can include cross point ReRAM non-volatile memory, which is discussed below.

Figure 2:
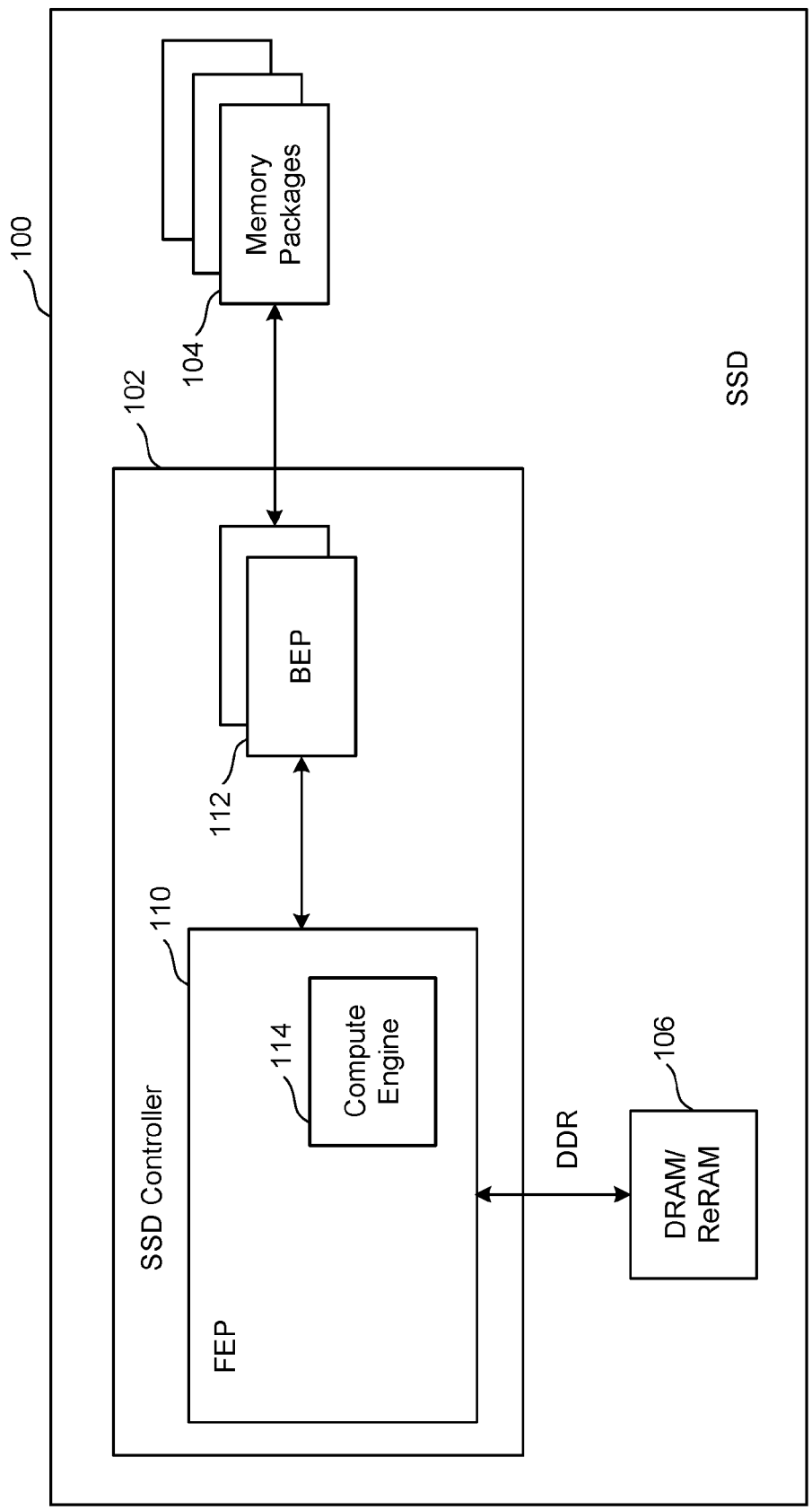
FIG. 2 is a block diagram of one embodiment of a solid state drive that comprises a Controller, non-volatile memory for storing data and a compute engine near the location of the data that can be used to perform common data manipulation operations.

FIG. 2 is a block diagram of one embodiment of a solid state drive 100 that comprises a controller 102, non-volatile memory 104 for storing data, DRAM/ReRAM 106 and a compute engine 114 near the location of the data that can be used to perform common data manipulation operations. The embodiment of FIG. 2 includes an SSD controller 102 comprising a Front End Processor Circuit (FEP) 110 and one or more Back End Processor Circuits (BEP) 112. In one embodiment the FEP 110 circuit is implemented on an ASIC. In one embodiment, each BEP circuit 112 is implemented on a separate ASIC. The ASICs for each of the BEP circuits 112 and the FEP circuit 110 are implemented on the same semiconductor such that the SSD controller 102 is manufactured as a SoC. FEP 110 and BEP 112 both include their own processors. In one embodiment, FEP 110 and BEP 112 work as a master slave configuration where the FEP 110 is the master and each BEP 112 is a slave. For example, FEP circuit 110 implements a flash translation layer, including performing memory management (e.g., garbage collection, wear leveling, etc.), logical to physical address translation, communication with the host, management of DRAM (local volatile memory) and management the overall operation of the SSD (or other non-volatile storage system). The BEP circuit 112 manages memory operations in the memory packages/die at the request of FEP circuit 110. For example, the BEP circuit 112 can carry out the read, erase and programming processes. Additionally, the BEP circuit 112 can perform buffer management, set specific voltage levels required by the FEP circuit 110, perform error correction (ECC), control the Toggle Mode interfaces to the memory packages, etc. In one embodiment, each BEP circuit 112 is responsible for its own set of memory packages. FIG. 2 shows the FEP circuit 110 in communication with each of the BEP circuits 112. In the implementation of FIG. 2, the compute engine 114 is designed in as a hardware circuit within FEP 110. The compute engine can access high speed, high-bandwidth memory using the DDR interface to access the DRAM 106. In this implementation, the bandwidth available to the compute engine is limited by the bandwidth that connects the FEP 110 to the BEP 112. DRAM 106 is one example of a local memory.

Figure 3:
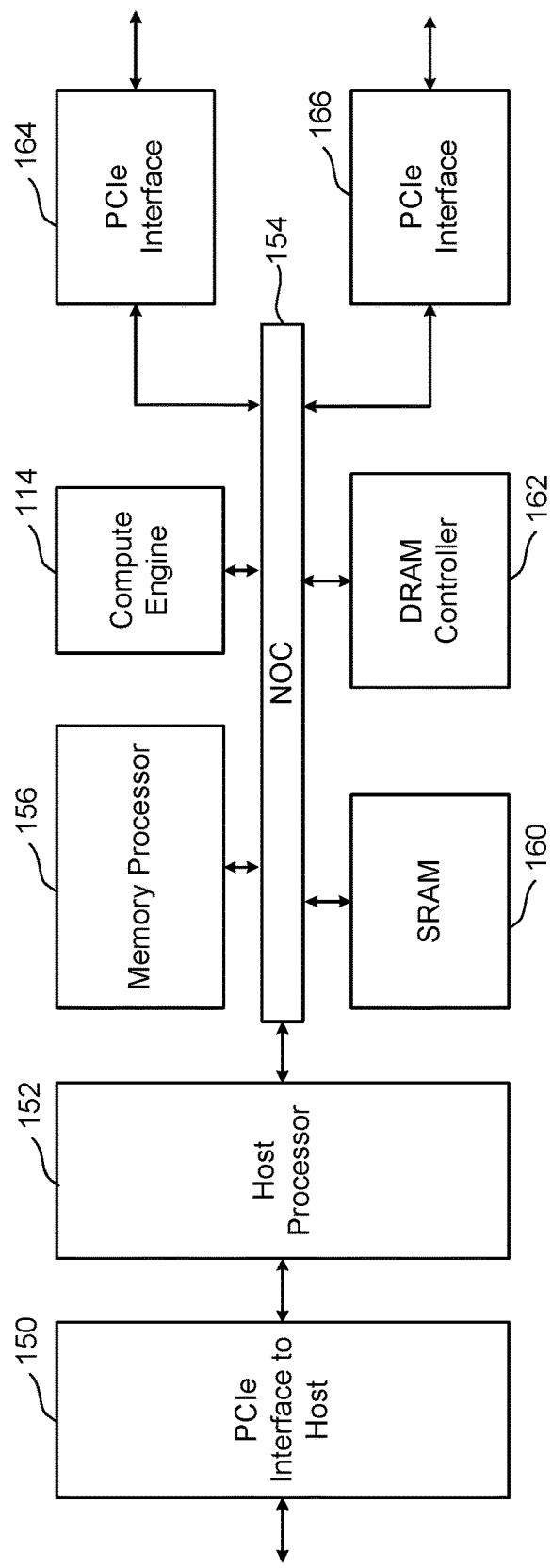
FIG. 3 is a block diagram of one embodiment of a Front End Processor Circuit with a compute engine. The Front End Processor Circuit is part of a Controller.

FIG. 3 is a block diagram of one embodiment of an FEP circuit with the compute engine 114 designed into the circuit. The FEP circuit of FIG. 3 is one example implementation of FEP circuit 110 of FIG. 2. FIG. 3 shows a PCIe interface 150 to communicate with the host and a host processor 152 in communication with that PCIe interface. The host processor 152 can be any type of processes known in the art that is suitable for the implementation. The host processor 152 is in communication with a network-on-chip (NOC) 154. An NOC is a communication subsystem on an integrated circuit, typically between cores in a SoC. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of SoCs and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, an NOC provides enhanced performance (such as throughput) and scalability in comparison with previous communication architectures (e.g., dedicated point-to-point signal wires, shared buses, or segmented buses with bridges). Connected to and in communication with NOC 154 is the memory processor 156, the compute engine 114, SRAM 160 and a DRAM controller 162. The DRAM controller 162 is used to operate and communicate with the DRAM (e.g., DRAM 106). SRAM 160 is local RAM memory used by the compute engine 114 or the memory processor 156. The memory processor 156 is used to run the FEP circuit and perform the various memory operations. Also in communication with the NOC are two PCIe Interfaces 164 and 166. In the embodiment of FIG. 3, the SSD controller will include two BEP circuits; therefore there are two PCIe Interfaces 164/166. Each PCIe Interface communicates with one of the BEP circuits. In other embodiments, there can be more or less than two BEP circuits; therefore, there can be more than two PCIe Interfaces. In these arrangements, the compute engine 114 is positioned (from the perspective of the host) behind the interface 150 to the host (e.g., on the memory system side of the interface to the host) and behind the API exposed by the Controller (e.g., exposed by the FEP circuit).

Figure 4:
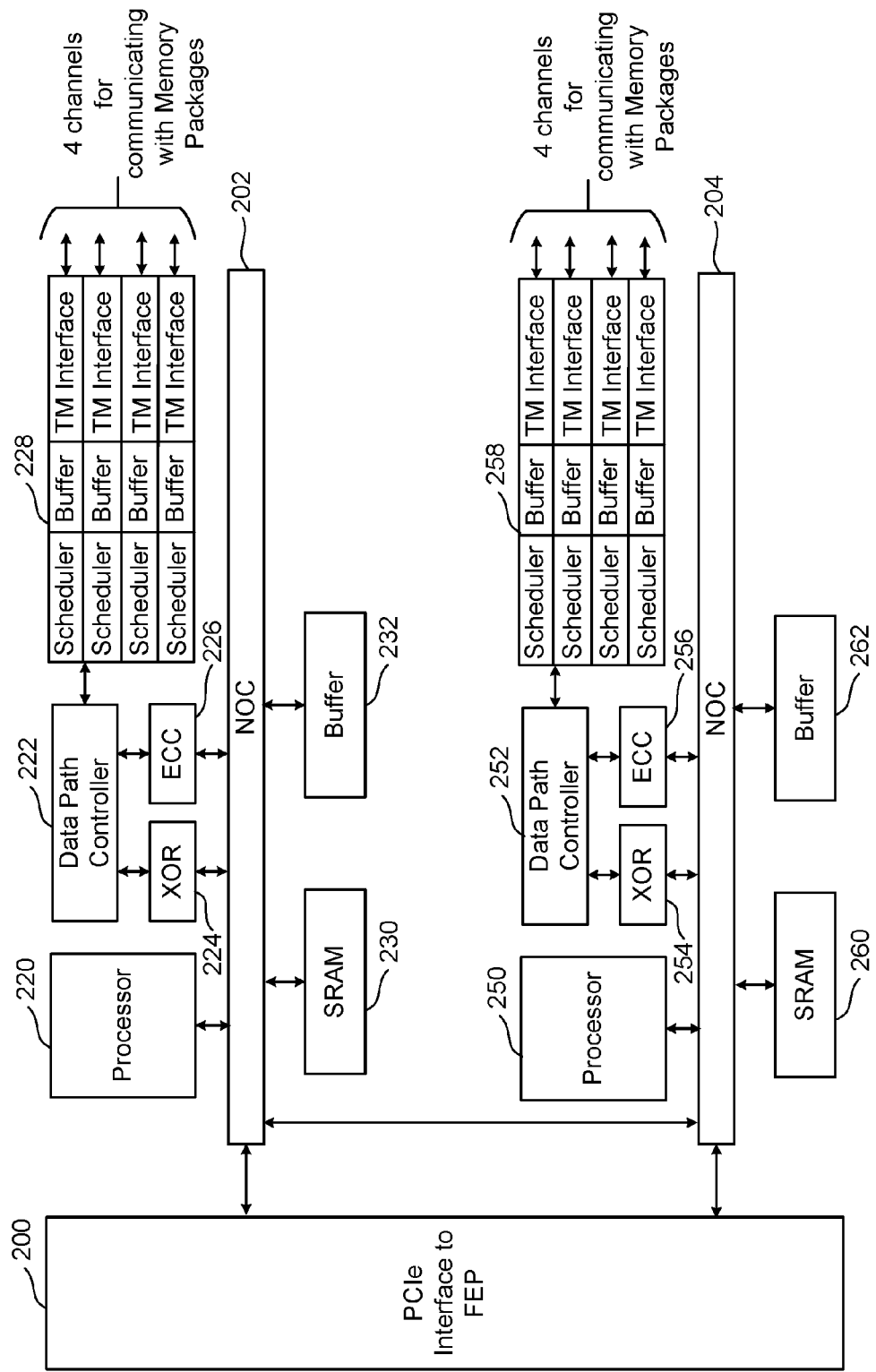
FIG. 4 is a block diagram of one embodiment of a Back End Processor Circuit. In some embodiments, the Back End Processor Circuit is part of a Controller.

FIG. 4 is a block diagram of one embodiment of the BEP circuit. The BEP circuit of FIG. 4 is one example implementation of BEP circuit 112 of FIG. 2. FIG. 4 shows a PCIe Interface 200 for communicating with the FEP circuit (e.g., communicating with one of PCIe Interfaces 164 and 166 of FIG. 3). PCIe Interface 200 is in communication with two NOCs 202 and 204. In one embodiment the two NOCs can be combined to one large NOC. Each NOC (202/204) is connected to SRAM (230/260), a buffer (232/262), processor (220/250), and a data path controller (222/252) via an XOR engine (224/254) and an ECC engine (226/256). The ECC engines 226/256 are used to perform error correction, as known in the art. The XOR engines 224/254 are used to XOR the data so that data can be combined and stored in a manner that can be recovered in case there is a programming error. The data path controller is connected to an interface module for communicating via four channels with memory packages. Thus, the top NOC 202 is associated with an interface 228 for four channels for communicating with memory packages and the bottom NOC 204 is associated with an interface 258 for four additional channels for communicating with memory packages. Each interface 228/258 includes four Toggle Mode interfaces (TM Interface), four buffers and four schedulers. There is one scheduler, buffer and TM Interface for each of the channels. The processor can be any standard processor known in the art. The data path controllers 222/252 can be a processor, FPGA, microprocessor or other type of controller. The XOR engines 224/254 and ECC engines 226/256 are dedicated hardware circuits, known as hardware accelerators. In other embodiments, the XOR engines 224/254 and ECC engines 226/256 can be implemented in software. The scheduler, buffer, and TM Interfaces are hardware circuits.

Figure 5:
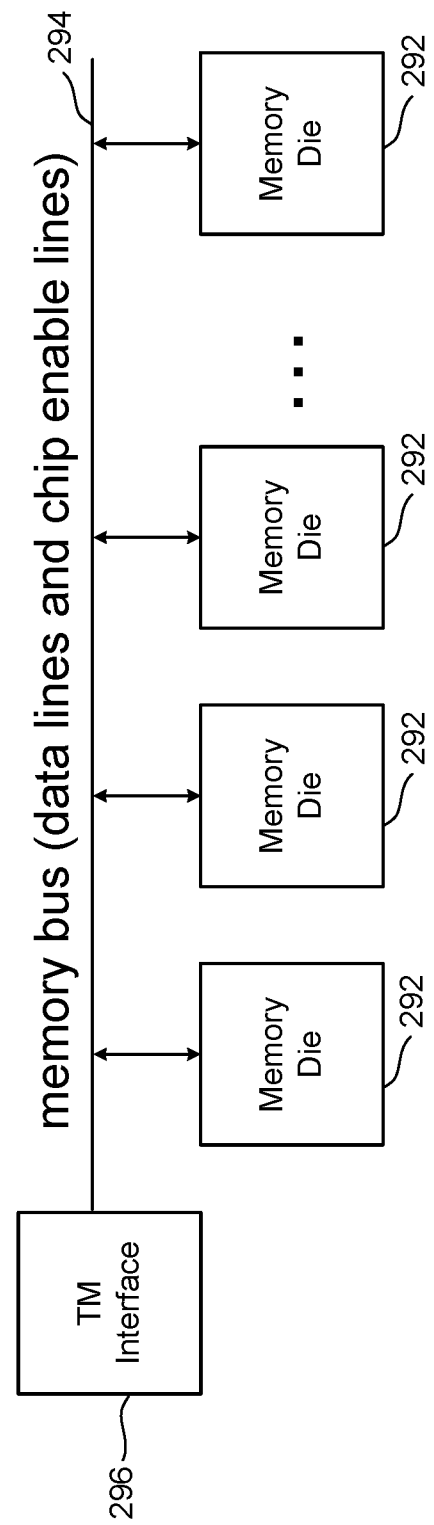
FIG. 5 is a block diagram of one embodiment of a memory package.

FIG. 5 is a block diagram of one embodiment of a memory package. For example, the memory package of FIG. 5 is an example implementation of a memory package included in memory packages 14 of FIG. 1 or memory packages 104 of FIG. 2. FIG. 5 shows a plurality of memory die 292 connected to a memory bus (data lines and chip enable lines) 294. The memory bus 294 connects to a Toggle Mode Interface 296 for communicating with the TM Interface of an BEP circuit (see e.g. FIG. 4). In some embodiments, the memory package can include a small controller connected to the memory bus and the TM Interface. The memory package can have one or more memory die. In one embodiment, each memory package includes eight or 16 memory die; however, other numbers of memory die can also be implemented. The technology described herein is not limited to any particular number of memory die.

Figure 6:
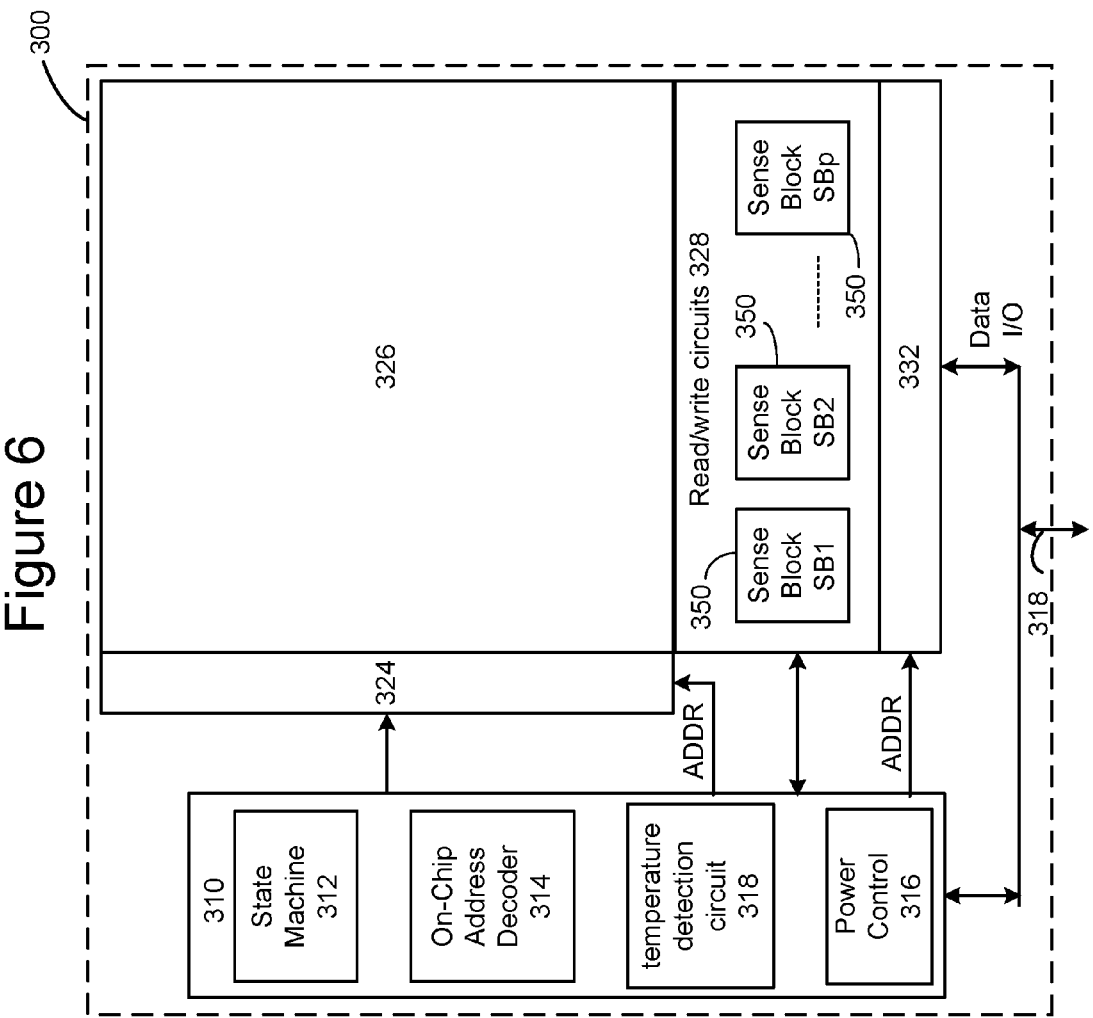
FIG. 6 is a block diagram of one embodiment of a memory die.

FIG. 6 is a functional block diagram of one embodiment of a memory die 300. Note that memory is one example implementation of memory die 292 of FIG. 5. The components depicted in FIG. 6 are electrical circuits. Memory die 300 includes a three dimensional memory structure 326 of memory cells (such as, for example, a 3D array of memory cells), control circuitry 310, and read/write circuits 328. In other embodiments, a two dimensional array of memory cells can be used. Memory structure 326 is addressable by word lines via a row decoder 324 and by bit lines via a column decoder 332. The read/write circuits 328 include multiple sense blocks 350 including SB1, SB2, . . . , SBp (sensing circuitry) and allow a page of memory cells to be read or programmed in parallel. Commands and data are transferred between to/from memory die 300 via lines 318. In one embodiment, memory die 300 includes a set of input and/or output (I/O) pins that connect to lines 318.

Memory structure 326 may comprise one or more arrays of memory cells including a 3D array. The memory structure may comprise a monolithic three dimensional memory structure in which multiple memory levels are formed above (and not in) a single substrate, such as a wafer, with no intervening substrates. The memory structure may comprise any type of non-volatile memory that is monolithically formed in one or more physical levels of arrays of memory cells having an active area disposed above a silicon substrate. The memory structure may be in a non-volatile memory device having circuitry associated with the operation of the memory cells, whether the associated circuitry is above or within the substrate.

Control circuitry 310 cooperates with the read/write circuits 328 to perform memory operations (e.g., erase, program, read, and others) on memory structure 326, and includes a state machine 312, an on-chip address decoder 314, a power control module 316 and a temperature detection circuit 318. The state machine 312 provides die-level control of memory operations. Temperature detection circuit 318 (which is on memory die 300) is configured to detect temperature at the memory structure 326, and can be any suitable temperature detection circuit known in the art. In one embodiment, state machine 312 is programmable by software. In other embodiments, state machine 312 does not use software and is completely implemented in hardware (e.g., electrical circuits). In one embodiment, control circuitry 310 includes registers, ROM fuses and other storage devices for storing default values such as base voltages and other parameters.

The on-chip address decoder 314 provides an address interface between addresses used by a host or controller to the hardware address used by the decoders 324 and 332. Power control module 316 controls the power and voltages supplied to the word lines and bit lines during memory operations. It can include drivers for word line layers (discussed below) in a 3D configuration, select transistors (e.g., SGS and SGD transistors, described below) and source lines. Power control module 316 may include charge pumps for creating voltages. The sense blocks include bit line drivers.

Multiple memory elements in memory structure 326 may be configured so that they are connected in series or so that each element is individually accessible. By way of non-limiting example, flash memory devices in a NAND configuration (NAND flash memory) typically contain memory elements connected in series. A NAND string is an example of a set of series-connected memory cells and select gate transistors that can be used to implement memory structure 326 as a three-dimensional memory structure.

A NAND flash memory array may be configured so that the array is composed of multiple NAND strings of which a NAND string is composed of multiple memory cells sharing a single bit line and accessed as a group. Alternatively, memory elements may be configured so that each element is individually accessible, e.g., a NOR memory array. NAND and NOR memory configurations are exemplary, and memory cells may be otherwise configured.

The memory cells may be arranged in the single memory device in an ordered array, such as in a plurality of rows and/or columns. However, the memory elements may be arrayed in non-regular or non-orthogonal configurations, or in structures not considered arrays.

A three dimensional memory array is arranged so that memory cells occupy multiple planes or multiple memory device levels, thereby forming a structure in three dimensions (i.e., in the x, y and z directions, where the z direction is substantially perpendicular and the x and y directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in they direction) with each column having multiple memory cells. The vertical columns may be arranged in a two dimensional configuration, e.g., in an x-y plane, resulting in a three dimensional arrangement of memory cells, with memory cells on multiple vertically stacked memory planes. Other configurations of memory elements in three dimensions can also constitute a three dimensional memory array.

By way of non-limiting example, in a three dimensional NAND memory array, the memory elements may be coupled together to form vertical NAND strings with charge-trapping material that traverse across multiple horizontal memory device levels. One example of a three dimensional NAND memory array that can be used to implement memory structure 126 can be found in U.S. Pat. No. 9,343,156, incorporated herein by reference in its entirety.

Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

A person of ordinary skill in the art will recognize that the technology described herein is not limited to a single specific memory structure, but covers many relevant memory structures within the spirit and scope of the technology as described herein and as understood by one of ordinary skill in the art.

Although an example memory system is a three dimensional memory structure that includes vertical NAND strings with charge-trapping material, other (2D and 3D) memory structures can also be used with the technology described herein. For example, floating gate memories (e.g., NAND-type and NOR-type flash memory), ReRAM memories, magnetoresistive memory (e.g., MRAM), and phase change memory (e.g., PCRAM) can also be used.

One example of a ReRAM memory includes reversible resistance-switching elements arranged in cross point arrays accessed by X lines and Y lines (e.g., word lines and bit lines). One example of a three dimensional memory array that can be used to implement memory structure 126 can be found in U.S. Patent Application 2016/0133836, "High Endurance Non-Volatile Storage," incorporated herein by reference in its entirety.

In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive memory (MRAM) stores data by magnetic storage elements. The elements are formed from two ferromagnetic plates, each of which can hold a magnetization, separated by a thin insulating layer. One of the two plates is a permanent magnet set to a particular polarity; the other plate's magnetization can be changed to match that of an external field to store memory. This configuration is known as a spin valve and is the simplest structure for an MRAM bit. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCRAM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. Note that the use of "pulse" in this document does not require a square pulse, but includes a (continuous or non-continuous) vibration or burst of sound, current, voltage light, or other wave.

Figure 7:
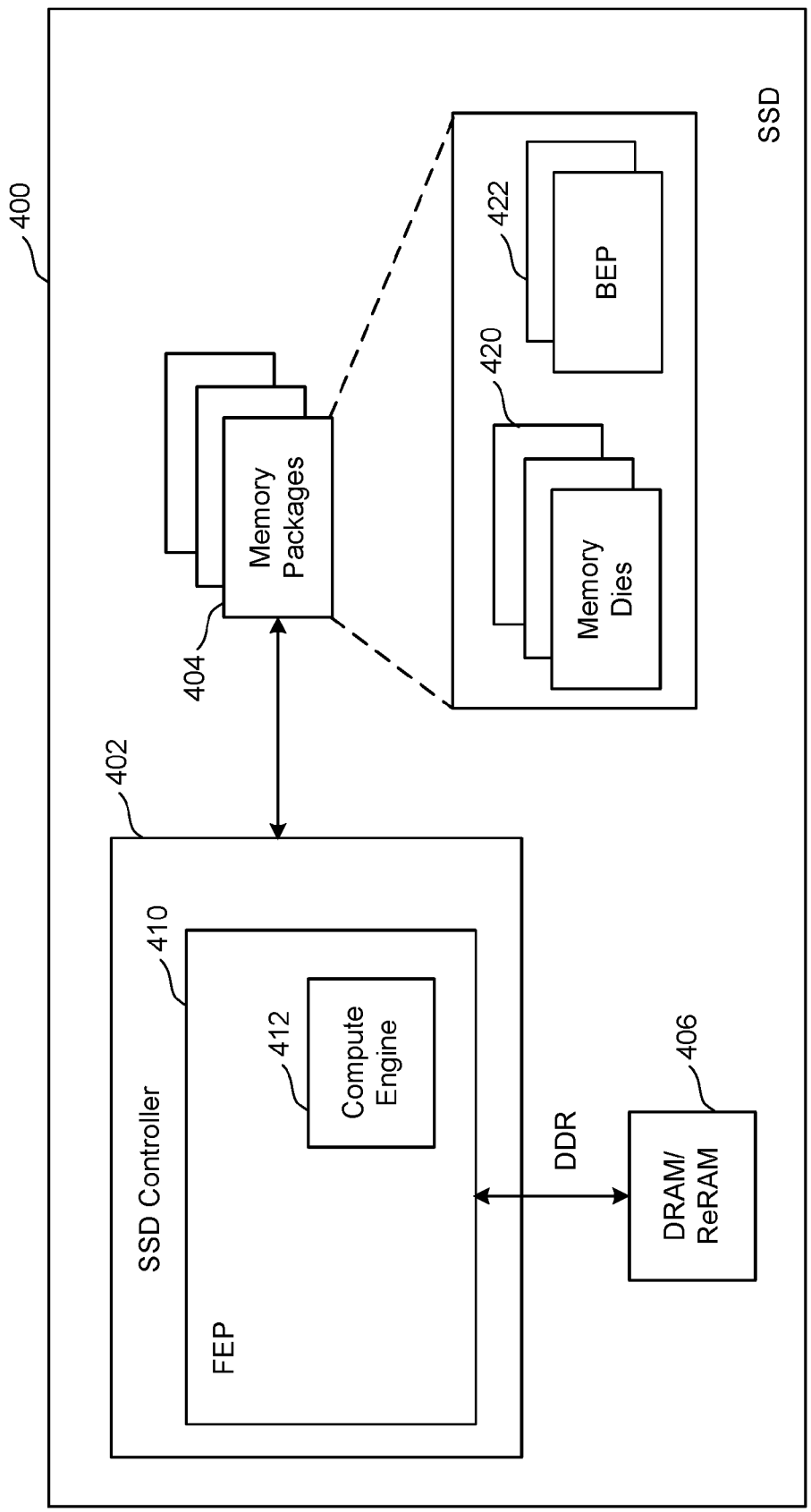
FIG. 7 is a block diagram of one embodiment of a solid state drive that comprises a Controller, non-volatile memory for storing data and a compute engine near the location of the data that can be used to perform common data manipulation operations.

FIG. 7 is a block diagram of one embodiment of a solid state drive 400 that comprises a controller 402, non-volatile memory packages 404 for storing data, DRAM/ReRAM 406, and a compute engine 412 near the location for that data that can be used to perform common data manipulation operations. Controller 402 includes FEP circuit 410. In the embodiment of FIG. 7, compute engine 412 is integrated within FEP circuit 410 and the one or more BEP circuits 422 are now incorporated within the memory packages 404. In this implementation, the SSD controller contains only one ASIC, for the FEP circuit. That is, the SSD controller 402 is in communication with the memory packages 404, where each memory package includes multiple memory die 420 and one or more BEP circuits 422. One example embodiment of memory die 420 is depicted in FIG. 6. One example of BEP circuit 422 is depicted in FIG. 4. One example of FEP circuit 410 with an integrated compute engine 412 is depicted in FIG. 3. DRAM/ReRAM 406 is an example of a local memory (e.g., local high speed volatile memory).

Figure 8:
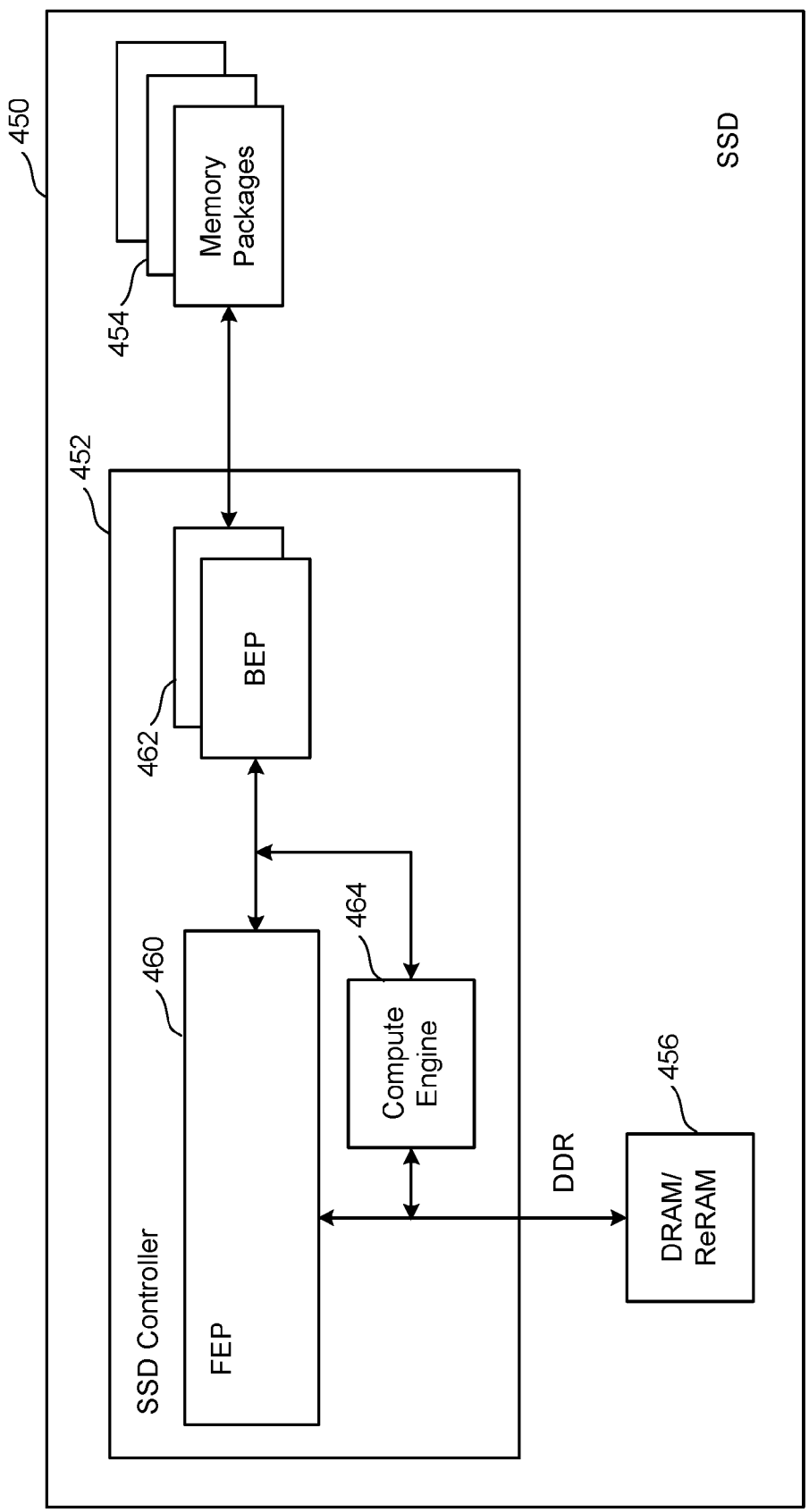
FIG. 8 is a block diagram of one embodiment of a solid state drive that comprises a Controller, non-volatile memory for storing data and a compute engine near the location of the data that can be used to perform common data manipulation operations.

FIG. 8 is a block diagram of one embodiment of a solid state drive 450 that comprises a controller 460, non-volatile memory packages 454 for storing data, DRAM/ReRAM 456, and a compute engine 464 near the location of the data that can be used to perform common data manipulation operations. In the embodiment of FIG. 8 the compute engine 464 is a standalone ASIC (application specific integrated circuit) that is integrated with the SSD controller 460 as a SoC. In this implementation, controller 460 includes a FEP circuit 460 in communication with one or more BEP circuits 462. Compute engine 464 is outside of and connected to FEP circuit 462, connected to the BEP circuit and connected to the high speed DRAM memory with separate interfaces. The bandwidth available to the compute engine 464 is lower than or equal to the bandwidth of the embodiment of FIG. 2. This implementation is preferred when the development of the FEP circuit 462 and the compute engine 464 needs to be kept separate. One example of BEP circuit 422 is depicted in FIG. 4. One example of memory packages 454 is depicted in FIG. 5. DRAM/ReRAM 456 is an example of a local memory (e.g., local high speed volatile memory).

Figure 9:
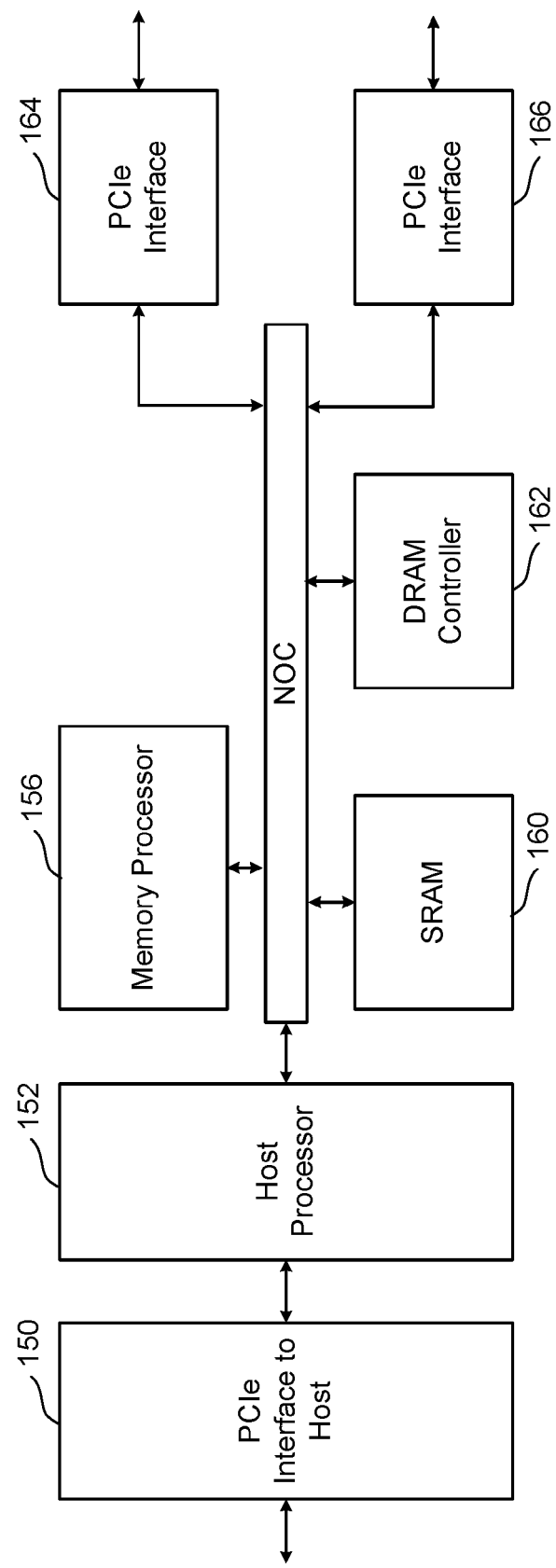
FIG. 9 is a block diagram of one embodiment of a Front End Processor Circuit without a compute engine. In some embodiments, the Front End Processor Circuit is part of a Controller.

FIG. 9 is a block diagram of one embodiment of a FEP circuit without a compute engine, that is suitable for the embodiment of FIG. 8 (e.g., FEP circuit 460). FIG. 9 shows all the components of FIG. 3, but without the compute engine. That is, FIG. 9 depicts PCIe interface 150, host processor 152, NOC 154, memory processor 156, SRAM 160, DRAM controller 162, and PCIe Interfaces 164 and 166. In the embodiment of FIG. 9, the SSD controller will include two BEP circuits; therefore there are two PCIe Interfaces. Each PCIe Interface communicates with one of the BEP circuits. In other embodiments, there can be more or less than two BEP circuits; therefore, there can be more or less than two PCIe Interfaces.

Figure 10:
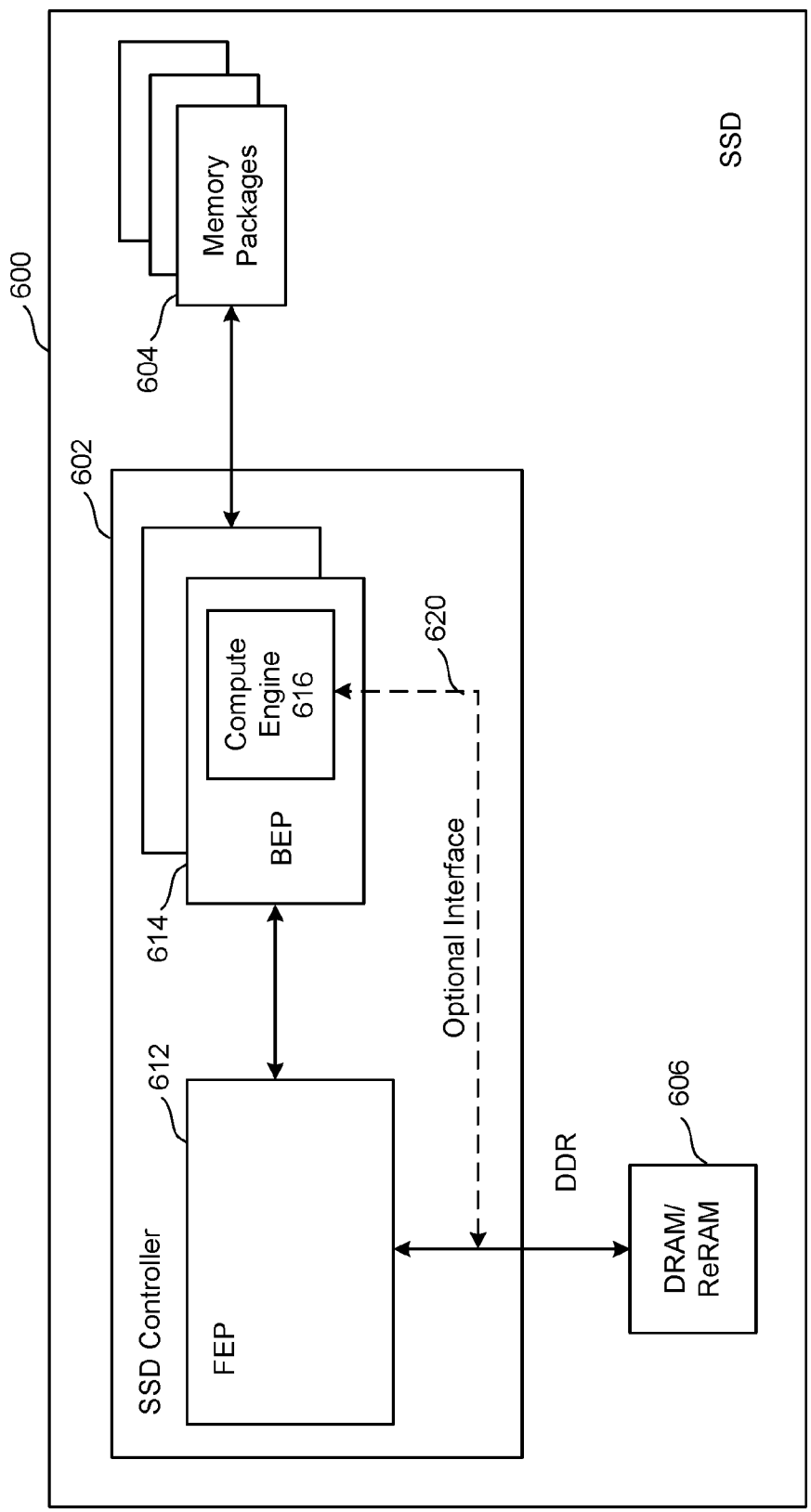
FIG. 10 is a block diagram of one embodiment of a solid state drive that comprises a Controller, non-volatile memory for storing data and a compute engine near the location of the data that can be used to perform common data manipulation operations.

FIG. 10 is a block diagram of one embodiment of a solid state drive 600 that comprises a controller 602, non-volatile memory packages 604 for storing data, DRAM/ReRAM 606, and compute engine 616 near the location of the data that can be used to perform common data manipulation operations. Controller 602 includes a FEP circuit 612 connected to one or more BEP circuits 614. In this embodiment a compute engine 616 is integrated with an BEP circuit 614. That is, the compute engine 616 is implemented in the ASIC for the BEP circuit 614. The bandwidth available to the compute engine is now determined by the number of toggle mode channels present in each BEP circuit and the bandwidth of the toggle mode channels. The BEP circuit 614 may also contain an optional interface 620 to connect to the DRAM/ReRAM chip. A direct interface to the high speed memory provides the compute engine 616 with fast access to the memory to store temporary working data. In the absence of a direct interface, temporary working data is streamed via the interface that connects the BEP circuits to the FEP circuit. One example of FEP circuit 612 is depicted in FIG. 9. One example of memory packages 604 is depicted in FIG. 5. DRAM/ReRAM 606 is an example of a local memory (e.g., local high speed volatile memory).

Figure 11:
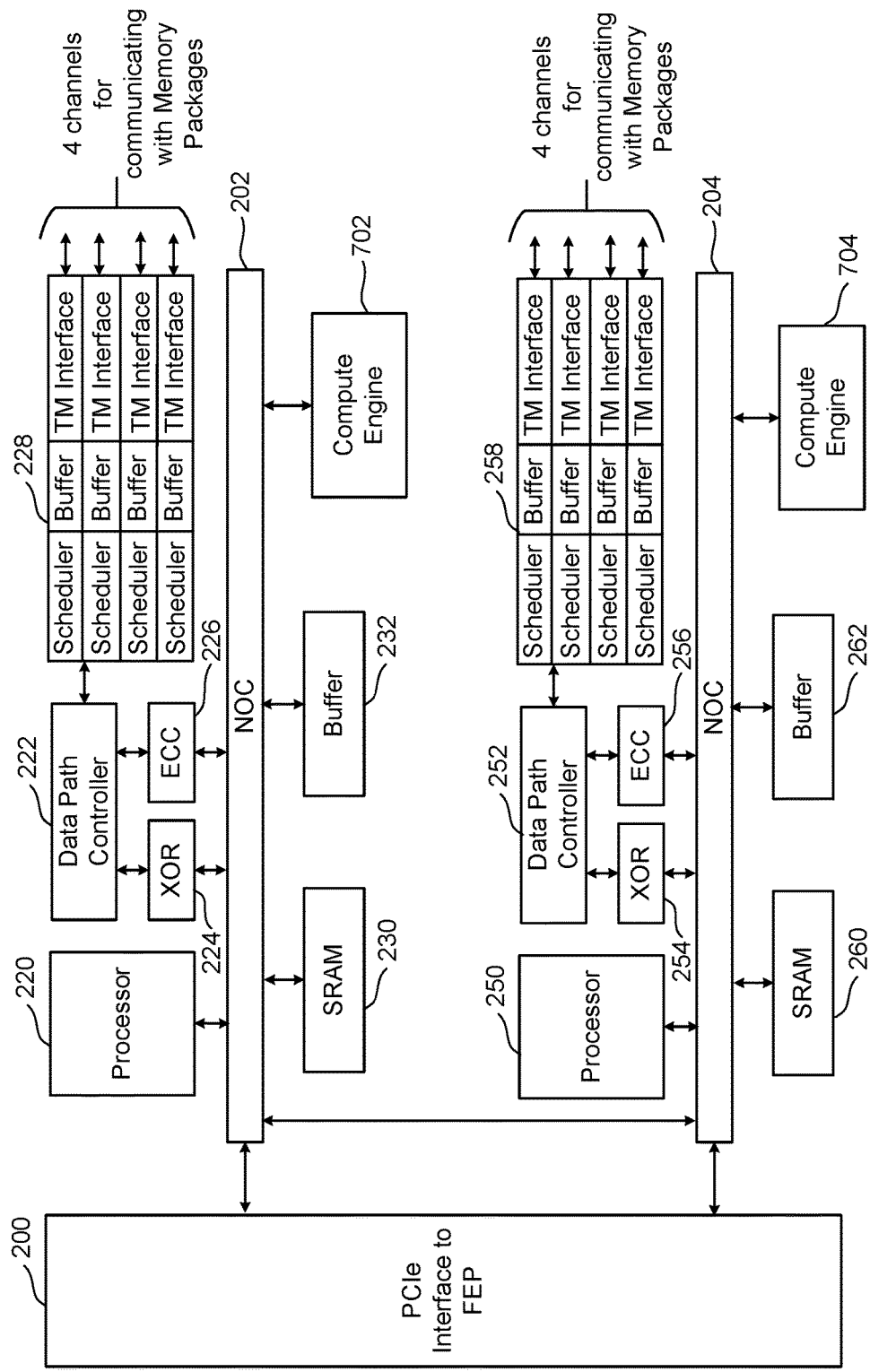
FIG. 11 is a block diagram of one embodiment of a Back End Processor Circuit with a compute engine. In some embodiments, the Back End Processor Circuit is part of a Controller.

FIG. 11 is a block diagram of one embodiment of an BEP circuit that includes a compute engine. The embodiment of the BEP circuit of FIG. 11 is appropriate for use in the embodiment of FIG. 10 (e.g., as an BEP circuit 614). The components of FIG. 11 are the same as the components of FIG. 4, but further includes a compute engine 702 connected to the top NOC 202 and a second compute engine 704 connected to the bottom NOC 204. In another embodiment, one compute engine can connect to both NOCs. In another embodiment, the two NOCs are connected together and the combined NOC will connect to one, two or multiple compute engines. In the embodiment of FIG. 11, there is one compute engine for each set of four channels. In other embodiments, the channels grouped together can include more or less than four channels.

Figure 12:
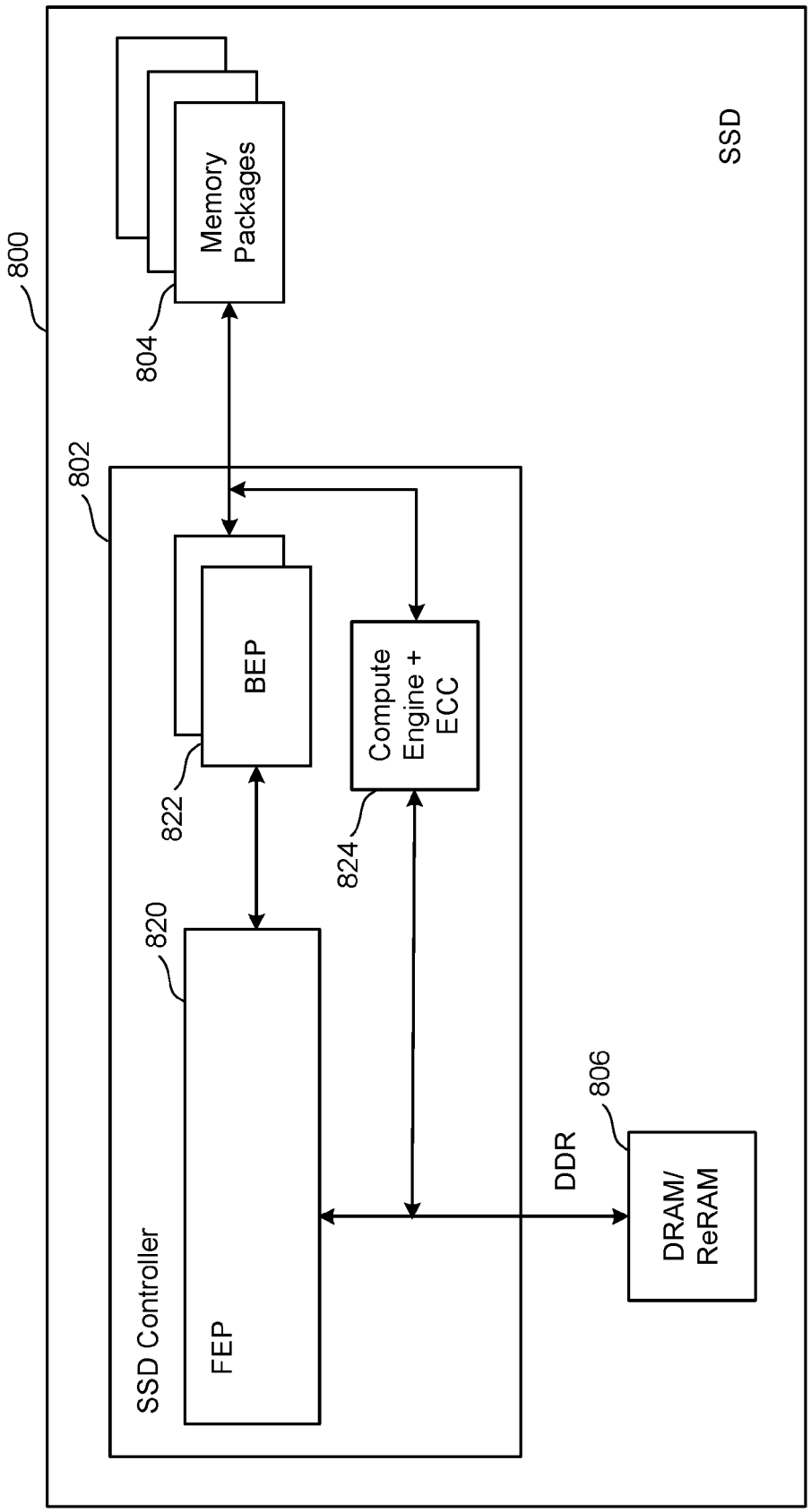
FIG. 12 is a block diagram of one embodiment of a solid state drive that comprises a Controller, non-volatile memory for storing data and a compute engine near the location of the data that can be used to perform common data manipulation operations.

FIG. 12 is a block diagram of one embodiment of a solid state drive 800 that comprises a controller 802, non-volatile memory packages 804 for storing data, DRAM/ReRAM 806 and a compute engine 824 near the location of the data that can be used to perform common data manipulation operations. Controller 802 includes FEP circuit 820 connected to one or more BEP circuits 822. In the embodiment of FIG. 12, compute engine 824 is a standalone ASIC that is connected directly to the toggle mode (TM) channels from the BEP circuits. In such implementations, the compute engine should optionally include an ECC engine in order to decode and correct data read from the flash memory (or other type of nonvolatile memory in the memory packages) before being processed by the compute engine. The compute engine 824 can also be connected to the high speed, high-bandwidth DRAM memory 806 through a standard DDR interface to the DRAM/ReRAM chip and to FEP circuit 820. One example of FEP circuit 820 is depicted in FIG. 9. One example of memory packages 804 is depicted in FIG. 5. One example of BEP circuit 822 is depicted in FIG. 4. DRAM/ReRAM 806 is an example of a local memory (e.g., local high speed volatile memory).

The embodiments discussed above show various implementations of integrating the compute engine with the controller. In a different set of implementations, the compute engine can be integrated with the memory package, referred to as memory package level integration.

Figure 13:
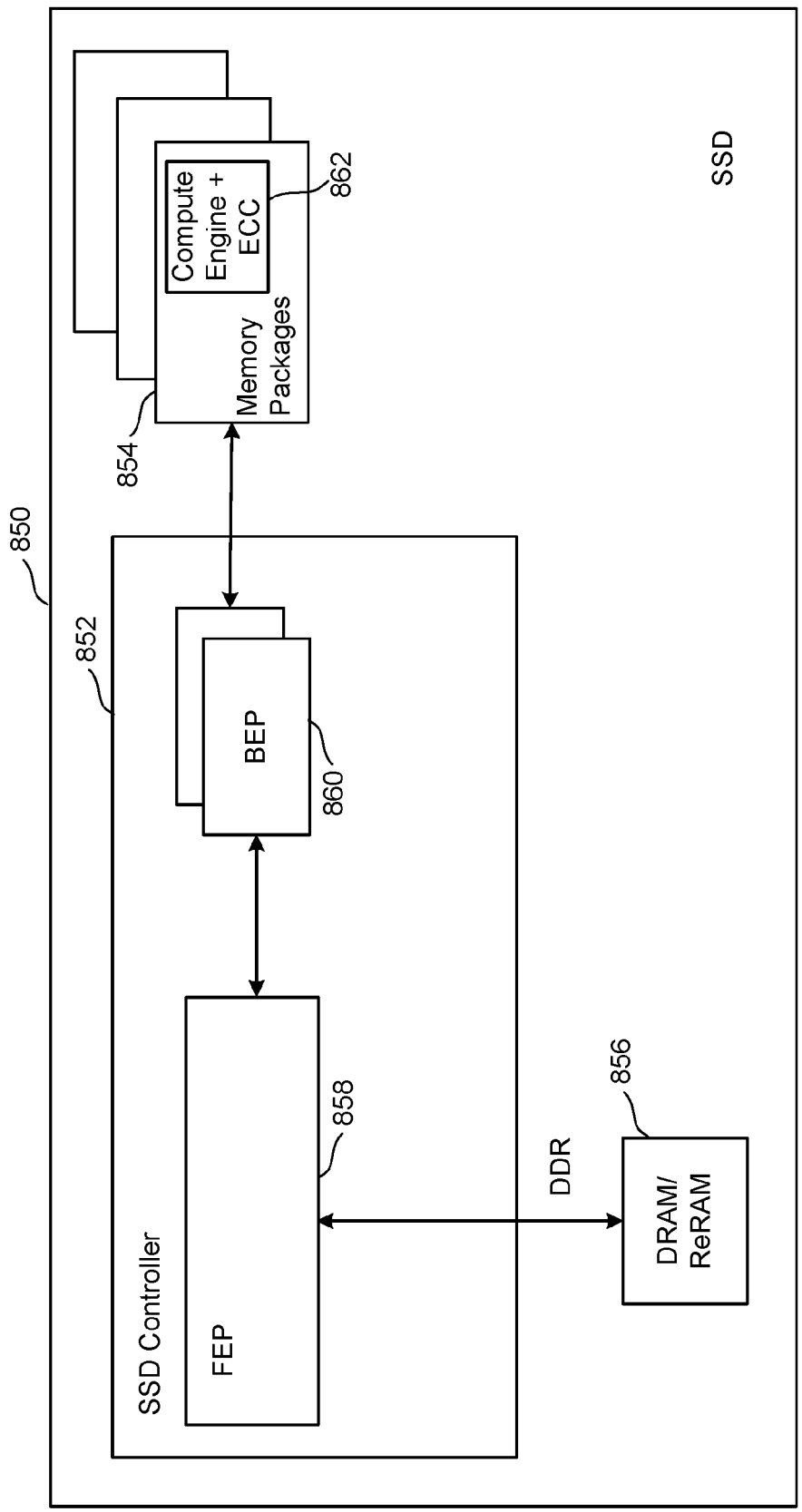
FIG. 13 is a block diagram of one embodiment of a solid state drive that comprises a Controller, non-volatile memory for storing data and a compute engine near the location of the data that can be used to perform common data manipulation operations.

FIG. 13 is a block diagram of one embodiment of a solid state drive 850 that includes memory package level integration, comprising a controller 852, non-volatile memory packages 854 for storing data, DRAM/ReRAM 856 and a compute engine 862 near the location of the data that can be used to perform common data manipulation operations. Controller 852 includes FEP circuit 858 connected to one or more BEP circuits 860. The one or more BEP circuits 860 connect to the non-volatile memory packages 854. One example of FEP circuit 858 is depicted in FIG. 9. One example of BEP circuit 860 is depicted in FIG. 4. DRAM/ReRAM 856 is an example of a local memory (e.g., local high speed volatile memory). In the embodiment depicted in FIG. 13, the compute engine is integrated with each memory package. A memory package, which typically includes multiple memory die (e.g., NAND non-volatile memory or other type of non-volatile memory), is now modified to include the compute engine ASIC (also known as a compute engine core) within the memory package. In one embodiment, the memory package should also include an ECC engine (or at least the decoder portion of the ECC engine) to decode code words read from the memory and to correct the data read from the non-volatile memory die before being processed by the compute engine. Thus, compute engine 862 includes an ECC engine. In other embodiments, the compute engine can operate on data that has not been subjected to ECC decoding. The memory package can optionally include high-speed memory like DRAM to support the compute engine with access to temporary working data. As the data management operations are within the memory package, the bandwidth available to the compute engine can be much higher than the toggle mode (TM) bandwidth available outside of the memory package.

Figure 13A:
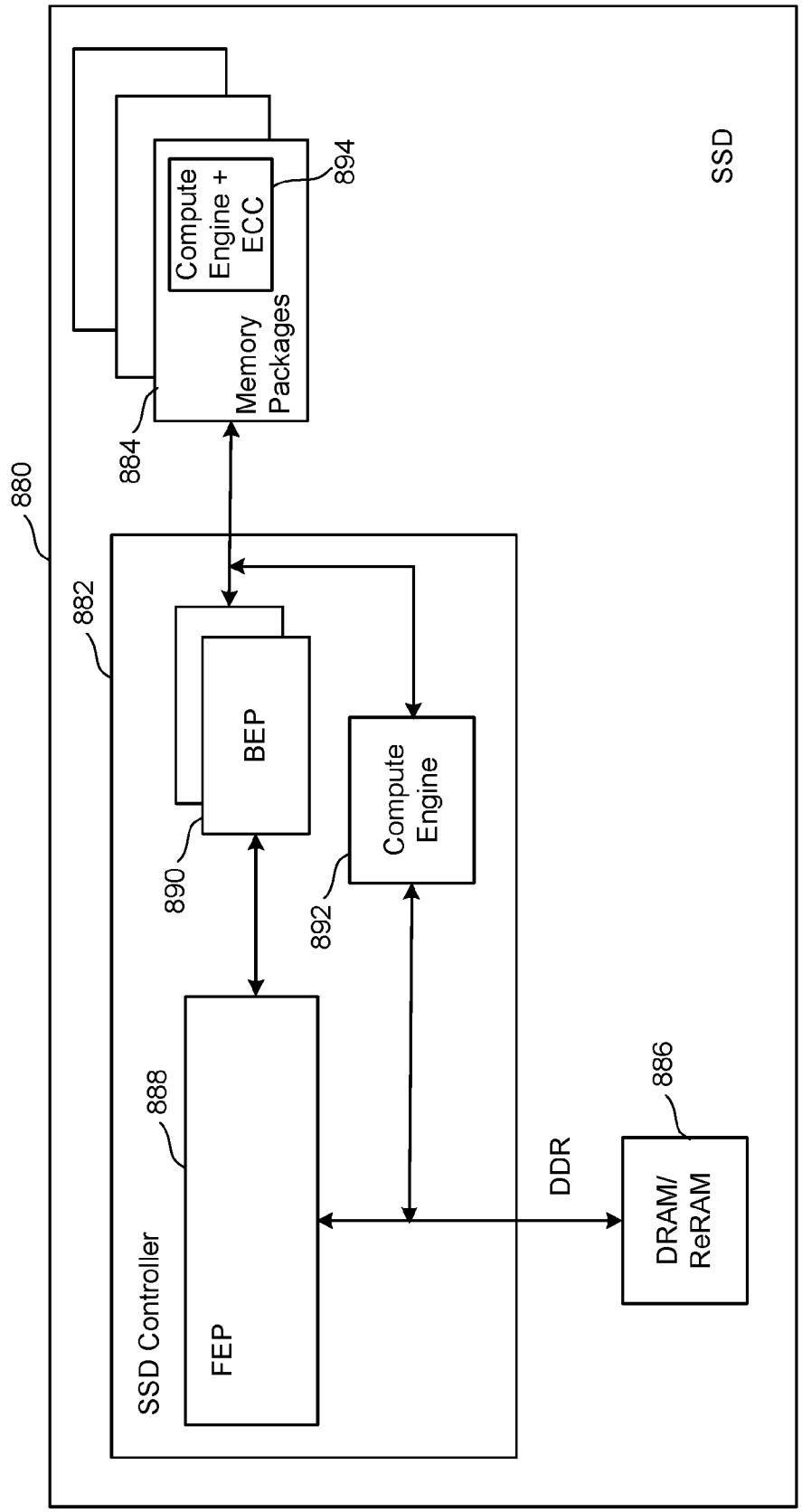
FIG. 13A is a block diagram of one embodiment of a solid state drive that comprises a Controller, non-volatile memory for storing data and a compute engine near the location of the data that can be used to perform common data manipulation operations.

FIG. 13A is a block diagram of one embodiment of a solid state drive 880 (or more generally, a data storage device) that includes controller 882, non-volatile memory packages 884 for storing data, and DRAM/ReRAM 886. Controller 882 includes FEP circuit 888 connected to one or more BEP circuits 890. The one or more BEP circuits 890 connect to the non-volatile memory packages 884. One example of FEP circuit 888 is depicted in FIG. 9. One example of BEP circuit 890 is depicted in FIG. 4. DRAM/ReRAM 886 is an example of a local memory (e.g., local high speed volatile memory).

The embodiment depicted in FIG. 13A includes multiple (or distributed) compute engines, such that compute engine 892 is positioned in controller 882 and a set of compute engines (with built-in ECC engine) 894 are positioned in non-volatile memory packages 884. For example, compute engine 892 is a standalone ASIC that is connected directly to the toggle mode (TM) channels from the BEP circuits (the interface between the BEP circuits and the memory packages/die). Compute engine 892 can also be connected to the high speed, high-bandwidth DRAM memory 886 through a standard DDR interface to the DRAM/ReRAM chip and to FEP circuit 888. Compute engine 894 is integrated with each memory package. In one embodiment, the memory package also includes an ECC engine (or at least the decoder portion of the ECC engine) to decode code words read from the memory and to correct the data read from the non-volatile memory die before being processed by the compute engine. Thus, compute engine 894 includes an ECC engine. In other embodiments, the compute engine can operate on data that has not been subjected to ECC decoding. The memory package can optionally include high-speed memory like DRAM to support the compute engine with access to temporary working data. As some data manipulation operations are within the memory package, the bandwidth available to the compute engine can be much higher than the toggle mode (TM) bandwidth available outside of the memory package. In some embodiments, the compute engines 892 and 894 will split up the work performed on the data. For example, code from the hosts can program the system to perform some operations on compute engine 892 and other operations on compute engine 894. For instance, the compute engine 894 could perform error correction coding (ECC) function along with simple application level tests, and the compute engine 892 could be executing a flash translation layer (FTL) optimized for sequential or indexed-sequential workloads, along with more complex filtering, sorting and grouping functions at the application query level.

Figure 14:
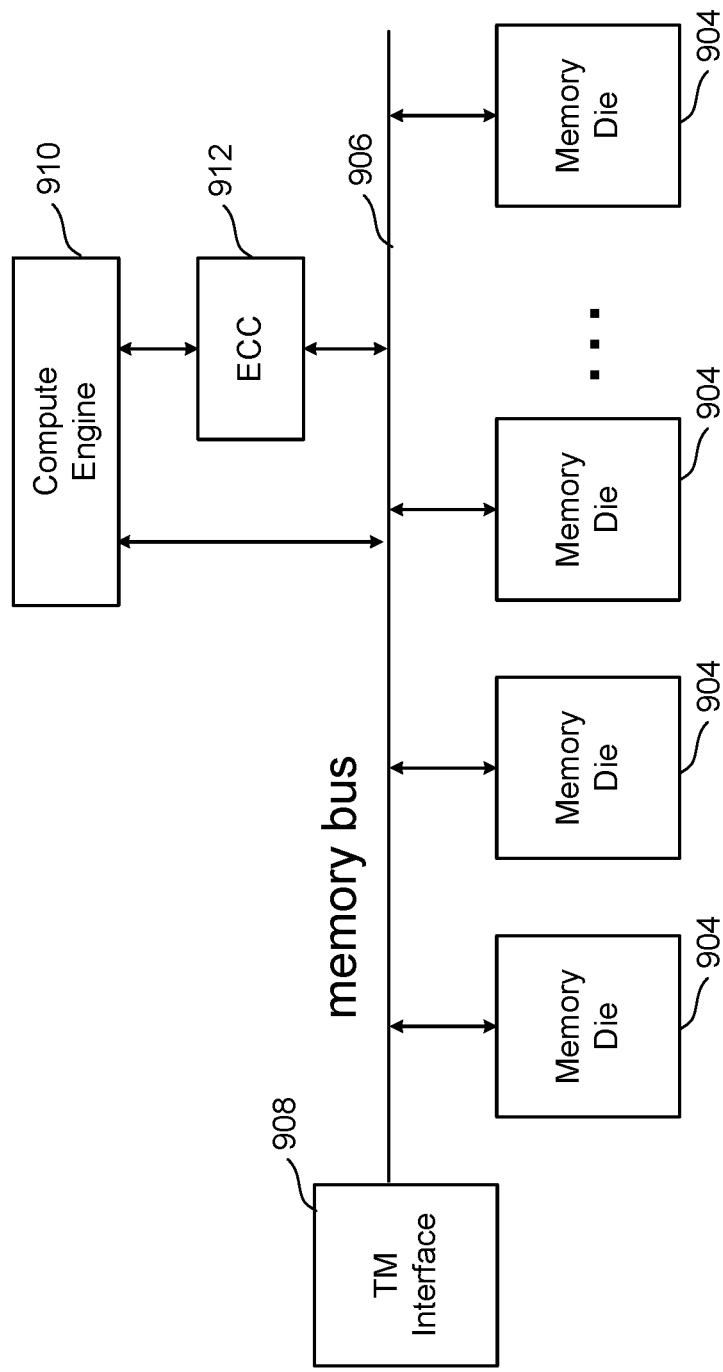
FIG. 14 is a block diagram of one embodiment of a memory package with a compute engine.

FIG. 14 is a block diagram of one embodiment of a memory package that includes a compute engine. The embodiment of 14 can be used to implement one of the memory packages 854 in FIG. 13 or memory packages 884 of FIG. 13A. The memory package of FIG. 14 includes a plurality of memory die 904 connected to a memory bus 906 (analogous to the memory bus of FIG. 5). Memory bus 906 is connected to a TM interface 908 for communicating with an BEP circuit. Additionally, FIG. 14 shows a compute engine 910 connected to the memory bus and to an ECC engine 912. The ECC engine 912 is also connected to memory bus 906. Memory read from a memory die can be subjected to ECC decoding (including fixing errors) and then presented to the compute engine 910 to perform any of the compute operations discussed herein.

Figure 15:
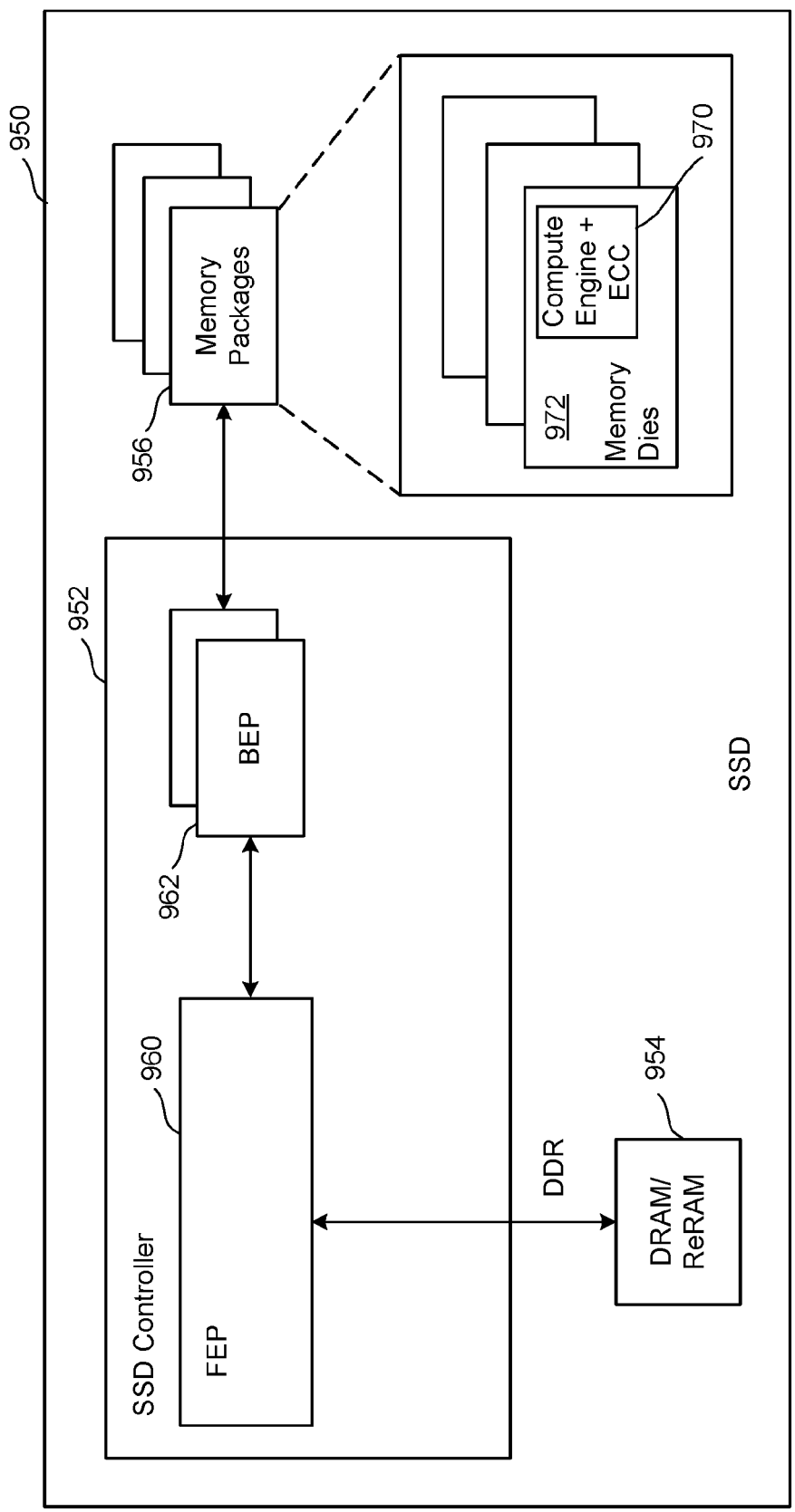
FIG. 15 is a block diagram of one embodiment of a solid state drive that comprises a Controller, non-volatile memory for storing data and a compute engine near the location of the data that can be used to perform common data manipulation operations.

FIG. 15 is a block diagram of one embodiment of a solid state drive 950 that comprises a controller 952, non-volatile memory packages 956 for storing data, DRAM/ReRAM 954, and a compute engine near the location of that data that can be used to perform common data manipulation operations. Controller 952 includes FEP circuit 960 connected to one or more BEP circuits 962. The one or more BEP circuits 962 connect to the non-volatile memory packages 956. One example of FEP circuit 960 is depicted in FIG. 9. One example of BEP circuit 962 is depicted in FIG. 4. DRAM/ReRAM 954 is an example of a local memory (e.g., local high speed volatile memory).

The embodiment of FIG. 15 implements memory package level integration. For example, each memory package includes multiple memory die and a compute engine 970 integrated within each memory die 972. In one embodiment, the compute engine will include an ECC engine to decode (including correcting) data read from the memory die. The ECC engine can be part of the compute engine or separate from the compute engine but otherwise included in the memory die.

Figure 16:
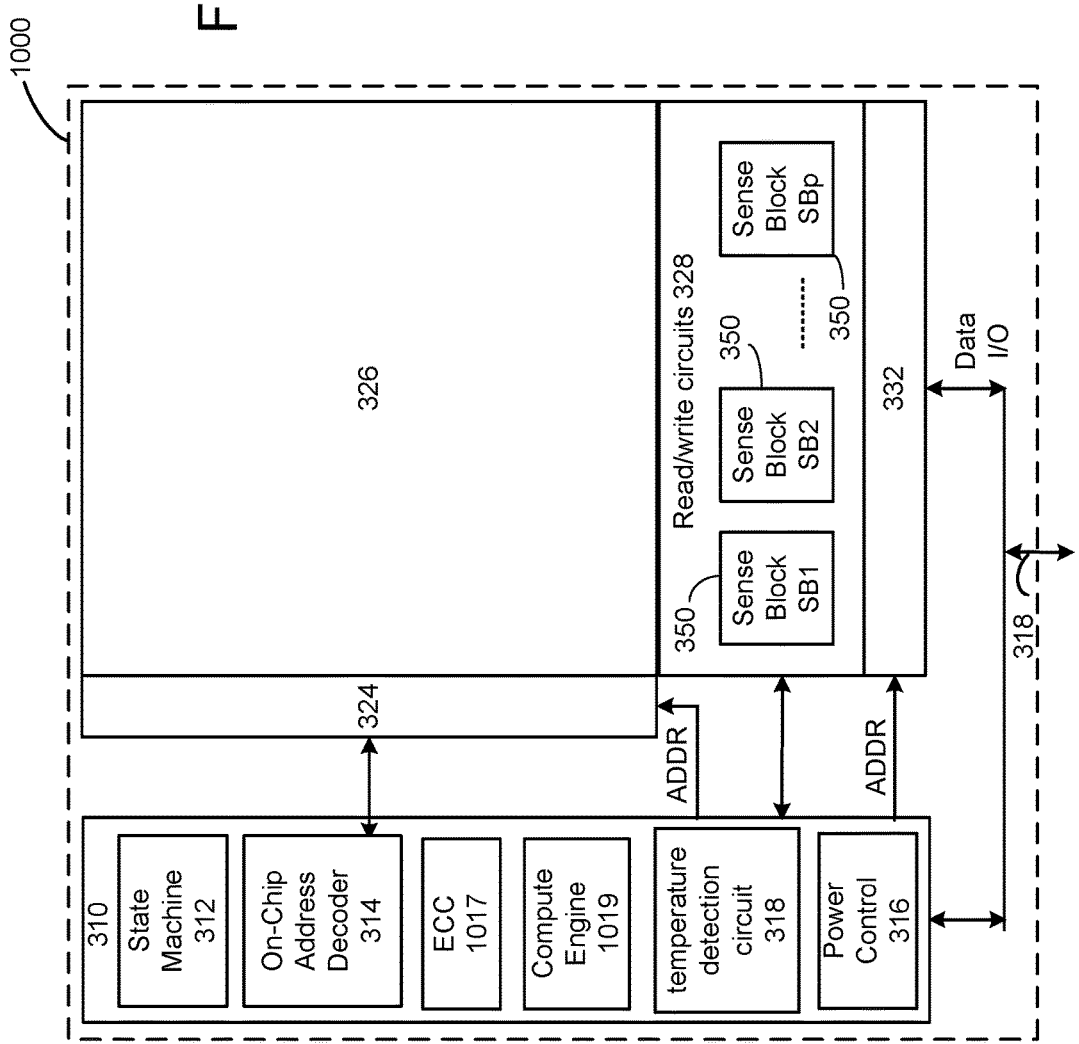
FIG. 16 is a block diagram of one embodiment of a memory die with a compute engine.

FIG. 16 is a block diagram of one embodiment of a memory die 1000 that includes a compute engine. For example, the memory die 1000 is an example implementation of memory die 972 of FIG. 15. The embodiment of FIG. 16 includes the elements of the embodiment of FIG. 6. For example, memory die 1000 includes a three dimensional memory structure 326 of memory cells (such as, for example, a 3D array of memory cells), control circuitry 310, read/write circuits 328, row decoder 324 and column decoder 332. Control circuitry 310 includes state machine 312, on-chip address decoder 314, a power control module 316 and a temperature detection circuit 318. Additionally, in the embodiment of FIG. 16, control circuitry 310 further includes ECC engine 1017 and compute engine 1019. Data read from the memory structure 326 is decoded using ECC engine 1017 and provided to compute engine 1019 for performing various compute operations, as discussed herein.

While the embodiments discussed above show the SSD controller to be implemented as a two ASIC solution containing a BEP ASIC and a FEP ASIC, it is also possible that the SSD controller is implemented with more or less than two ASICs. In that case, the design space can be expanded to place the compute engine within any one or more of the ASICs. Additionally, the compute engine can be placed outside of the ASICs. In other embodiments, the SSD controller can include different architectures, other than the FEP/BEP architecture. Even in the other architectures, the SSD controller can still be configured to include a compute engine inside one of the ASICs or circuits or modules. Additionally, a compute engine can be added to SSDs that are not implemented using ASICs, but implemented using other hardware.

Figure 17:
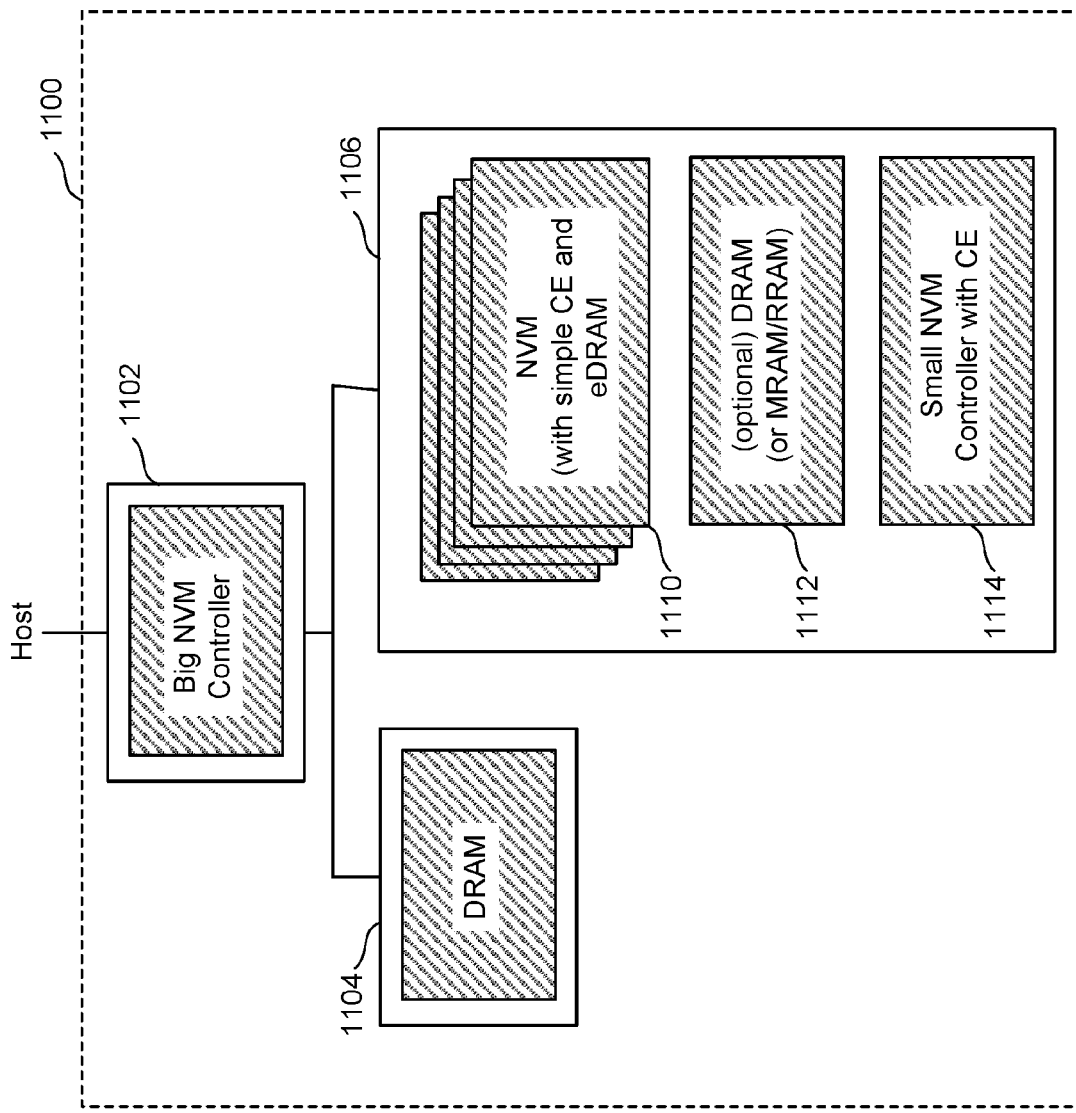
FIG. 17 is a block diagram of one embodiment of a solid state drive that comprises a Controller, non-volatile memory for storing data and a compute engine near the location of the data that can be used to perform common data manipulation operations.

The embodiment of FIG. 15 includes integrating the compute engine within the memory die (such as a NAND memory die or ReRAM memory die). FIG. 17 is a block diagram providing additional details for implementing an embodiment of the system of FIG. 15. Specifically, FIG. 17 shows a host in communication with a SSD 1100 (implemented on a printed circuit board) that includes a Big NVM controller 1102 and a Small NVM controller 1114. The Big NVM controller 1102 is in communication with DRAM 1104 and memory package 1106.

In one embodiment, memory package 1106 includes several memory die 1110, optional DRAM (or MRAM/RRAM/PCM/eDRAM) 1112, and Small NVM Controller 1114. Each of the memory die 1110 has an on die compute engine (CE). In one embodiment the on die compute engine is implemented using CMOS technology on the top surface of a substrate and under the monolithic three-dimensional memory array. Potentially, eDRAM/STT-MRAM/PCM as well as SRAM can be integrated. The on die compute engine (CE) can perform some of the data manipulation operations.

In one embodiment, Small NVM Controller 1114 includes a compute engine (CE) that can perform some of the data manipulation operations. Small NVM Controller 1114 can communicate with the internal memory dies and external chips (i.e. Big NVM controller and DRAM in FIG. 17). Optional DRAM 1112 is used for the Small NVM Controller 1114 to store working data sets. By off-loading computation from the Big NVM Controller 1102 to Small NVM controller with a computer engine (CE) 1114 and the simple CE of the memory die 1110, the external DRAM requirement and communication overhead can be reduced.

FIG. 17 shows that each of Big NVM Controller 1102, DRAM 1104, memory die 1110, DRAM 1112 and Small NVM Controller 1114 can be implemented on separate silicon die in three different packages mounted on one printed circuit board. Thus, FIG. 17 provides a big and small NVM controller architecture. The Big NVM Controller 1102 interfaces with the host and DRAM. The Small NVM Controller 1114 can be inside any of the memory packages. The Small NVM Controller 1114 includes a computational engine with optional DRAM and manages multiple NVM channels. A mapping table can be stored in the optional DRAM (or MRAM/PRAM).

Figure 18:
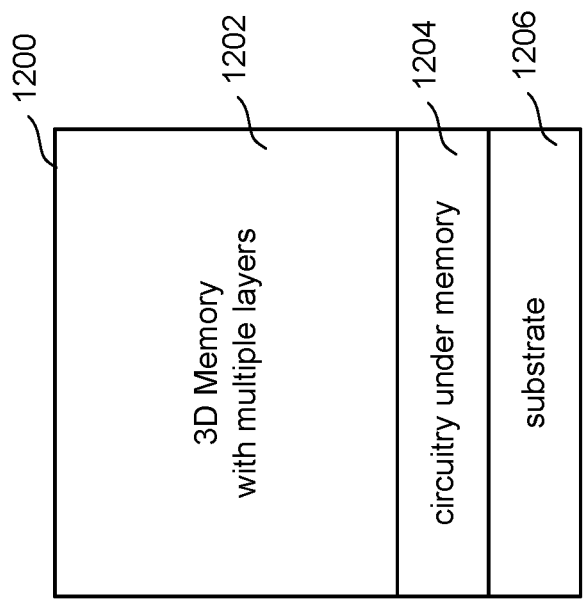
FIG. 18 is a block diagram of one embodiment of a memory die with circuitry under the memory array.

FIG. 18 is a block diagram of one embodiment of a memory die 1200 with circuitry under the memory array. FIG. 18 shows a monolithic three-dimensional memory structure 1202 with multiple layers. Underneath the memory structure 1202 is circuitry 1204 that is implemented on the top surface of the substrate 1206 and under the memory array 1202. In one embodiment, the circuitry 1204 is implemented using CMOS technology. For example, simple computational logic can be integrated in the CMOS logic under the memory array 1204 potentially with eDRAM/STT-MRAM/PCM as well as SRAM/latches. Simple circuitry logic (i.e., randomizer, ID generator, PUF, or AES) and simple error management logic (i.e., error location map or a simple error avoiding algorithm such as read reference optimizer) as well as ECC can be integrated in the CMOS logic under the memory array 1202 as examples of the compute engine discussed above. This improves latency and performance by eliminating data transfer overhead from the memory die to the separate controller die. An FPGA could be integrated, supporting multiple configurations with a single system on a chip as an aforementioned compute engine. An FPGA can be integrated, supporting multiple configurations within a system on a chip.

Additionally, other functions can be integrated as an aforementioned compute engine. For example, a CPU or parallel computational engine can be integrated as an aforementioned compute engine. An SIMD engine ("GPU"), neural network, DSP engine (e.g., image/audio processing), digital logic operation (multiplication, addition, subtraction, XOR, etc.), data mining (apriori, k-means, pagerank, decision tree) or pattern matching (i.e., Hamming distance calculation), FPGA fabric supporting multiple configurations in the memory die, high speed I/O circuits with memory equalizers, circuits for optical or capacitor/inductive coupling based on interconnections can also be used. In one embodiment, the compute engine needs to be able to work with encrypted data when AES is bypassed for specific applications. In some embodiments, the compute engine may need to work with erroneous data when ECC is bypassed for specific applications.

Figure 19:
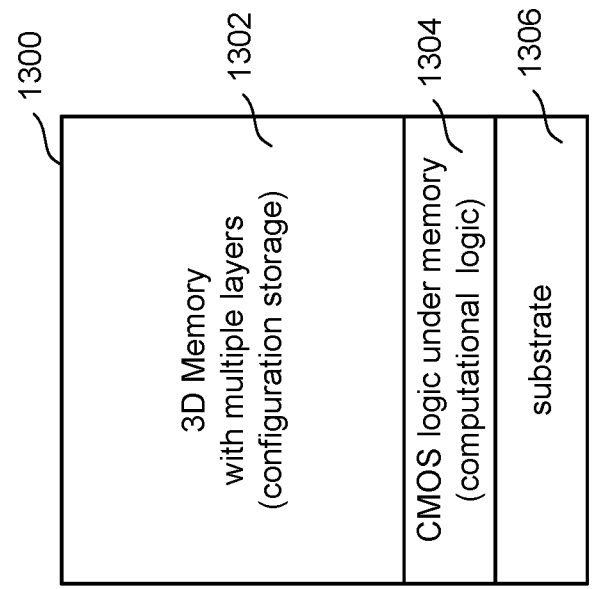
FIG. 19 is a block diagram of one embodiment of a memory die with circuitry under the memory array.

FIG. 19 is a block diagram of one embodiment of a memory die 1300 with circuitry 1304 under the memory array 1302 for using the non-volatile memory die 1300 as a non-volatile-FPGA. The memory die 1300 will include a three-dimensional monolithic memory array 1302. Implemented on the top surface of the substrate 1306, and under the memory array 1302, will be CMOS logic 1304 that implements a FPGA to be used as a compute engine (per the discussion above). This system will use the memory array 1302 (NAND or other type of non-volatile memory) as configuration storage for the reconfigurable logic 1304 of the FPGA. That is, configuration data stored in memory array 1302 is used to configure the FPGA's. This will make the FPGA non-volatile. This will allow for fast boot up compared to conventional FPGAs, which require a reading of configuration data from a discrete nonvolatile memory device to the volatile FPGA cell array. When the FPGA (hardware accelerator/compute engine) is not needed, the configuration storage (the memory array) can be used as just normal non-volatile storage, saving idle power.

Figure 20:
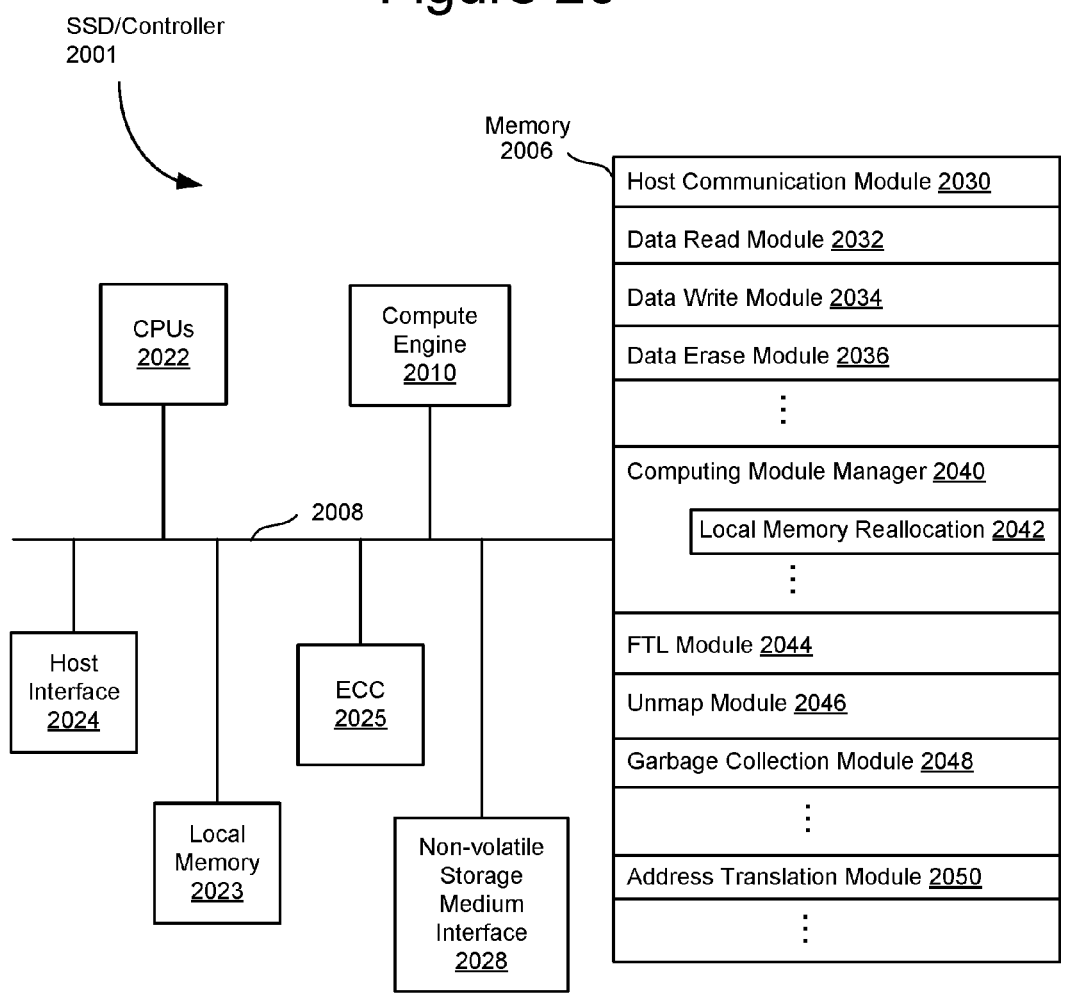
FIG. 20 is a block diagram depicting one embodiment of a controller.

FIG. 20 is a block diagram depicting one embodiment of a controller that can be used with a memory system implementing the technology proposed herein. It is noted that the components represented in FIG. 20 may vary depending on the configuration of a particular storage system, and that the representations shown in FIG. 20 are merely non-limiting examples. In some embodiments, controller 2001 (also referred to herein as a "memory controller" or "SSD controller," such as any of the controllers shown in and described above with reference to FIGS. 1-2, 7-8, 10, and 12) includes one or more processing units 2022 (sometimes herein called CPUs, processors, or hardware processors, and sometimes implemented using microprocessors, microcontrollers, or the like) for executing modules, programs, and/or instructions stored in memory 2006 and thereby performing data manipulation operations; memory 2006 (sometimes herein called controller memory); and one or more communication buses 2008 for interconnecting these components. In some embodiments, the one or more CPUs 2022 are shared by one or more components within, and in some cases beyond, the function of controller 2001. In some embodiments, controller 2001 includes host interface 2024, error control module 2025 and storage medium interface 2028, which couples controller 2001 to non-volatile memory, such as the memory packages shown FIGS. 1, 2, 7, 8, 10, 12, 13, 13A and 15. Host interface 2024 provides an interface to a host system (e.g., through data connections). Communication buses 2008 optionally include circuitry (sometimes called a chipset) that interconnects and controls communications between system components. In some embodiments, controller 2001 is coupled with one or more memory devices (e.g., persistent storage), such as the memory packages and/or memory die shown in FIGS. 1-2, 7-8, 10, 12, 13, 13A and 15 through communication buses 2008, and optionally manages the operation of the memory devices.

In some embodiments, error control module 2025 is provided to limit the number of uncorrectable errors inadvertently introduced into data during writes to memory (e.g., persistent storage) or reads from memory. In some embodiments, error control module 2025 is executed in software by the one or more CPUs 2022, and, in other embodiments, error control module 125 is implemented in whole or in part using special purpose circuitry to perform data encoding and decoding functions. To that end, in some embodiments, error control module 125 encodes data by applying an error correction code (or error correction coed algorithm) to produce a codeword, which is subsequently stored in memory. When the encoded data (e.g., one or more codewords) is read from memory, error control module 125 applies a decoding process to the encoded data to recover the data, and to correct errors in the recovered data within the error correcting capability of the error control code. Those skilled in the art will appreciate that various error correction codes have different error detection and correction capacities, and that particular codes are selected for various applications for reasons beyond the scope of this disclosure. As such, an exhaustive review of the various types of error correction codes is not provided herein. Moreover, those skilled in the art will appreciate that each type or family of error correction codes may have encoding and decoding algorithms that are particular to the type or family of error control codes. On the other hand, some algorithms may be utilized at least to some extent in the decoding of a number of different types or families of error correction codes. As such, for the sake of brevity, an exhaustive description of the various types of encoding and decoding algorithms generally available and known to those skilled in the art is not provided herein.

As illustrated in FIG. 20, controller 2001 also includes compute engine 2010. In some embodiments, compute engine 2010 performs data manipulation operations on data stored in and/or retrieved from one or more memory devices with which controller 2001 is coupled, in response to data manipulation instructions received the host via host interface 2024. In some embodiments, such as those represented by FIGS. 13, 13A and 15, compute engine 2010 (and optionally error control module 2025) may be included in one or more memory devices and/or one or more memory die of the memory devices.

In the embodiment shown in FIG. 20, controller 2001 also includes local memory 2023. In other embodiments (such as those represented by FIGS. 1-2, 7-8, 10, 12-13, 13A and 15), local memory 2023 is external to controller 2001 and coupled with controller 2001 through data connections such as communication buses 2008. In some embodiments, local memory 2023 is used as working memory for data manipulation operations performed by compute engine 2010 (e.g., in a data manipulation or computing mode), as discussed in more detail below. In some embodiments, local memory 2023 is used for read and write operations from persistent storage (e.g., non-volatile memory described above), for example, in a normal operation mode of controller 2001. In some embodiments, local memory 2023 serves, at least in part, as a write buffer to hold data (e.g., received in conjunction with a write command from a host system, sometimes known as a host, or as a client or client system) for transfer to persistent storage during a write operation, and/or as a read buffer to hold data obtained from persistent storage (e.g., in response to a read command from a host system), which may then be made available to a requesting host system. In some embodiments, local memory 2023 is internal to controller 2001.

Memory 2006 typically includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 2006 optionally includes one or more storage devices remotely located from processor(s) 2022. In some embodiments, memory 2006, or alternately the non-volatile memory device(s) within memory 2006, comprises a non-transitory computer readable storage medium. In some embodiments, memory 2006, or the computer readable storage medium of memory 2006, stores the following programs, modules, and data structures, or a subset or superset thereof:

a host communication module 2030 that is used for communicating with other components, such as a host system (e.g., using a defined interface standard for communication, such as double data rate type three (DDR3), typically used for communications with certain types of synchronous dynamic random access memory (e.g., DDR3 SDRAM));

a data read module 2032 that is used for reading data from persistent storage;

a data write module 2034 that is used for writing data to persistent storage;

a data erase module 2036 that is used for erasing data written to persistent storage;

a computing module manager 2040 that is used for managing the operation of computing module 2010, and that may include local memory reallocation module 2042 for managing the allocation of local memory 2023;

optionally, one or more modules for storage device-based address translation implementations that may include:

a flash translation layer (FTL) module 2044 that is used for performing logical-to-physical address translation;

an unmap module 2046 that is used for unmapping logical addresses from physical addresses (e.g., in response to unmap or erase commands);

a garbage collection module 2048 used for controlling a garbage collection process in a memory device (e.g., persistent storage);

optionally, one or more modules for host-based address translation implementations that may include:

an address translation module 2050 for performing logical-to-physical address translation using address translation information provided by a host system.

Each of the above identified elements may be stored in one or more of the previously mentioned memory devices that together form memory 2006, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 2006 may store a subset of the modules and data structures identified above. Furthermore, memory 2006 may store additional modules and data structures not described above. In some embodiments, the programs, modules, and data structures stored in memory 2006, or the computer readable storage medium of memory 2006, provide instructions for implementing respective operations in the methods described below with reference to FIGS. 21, 23A-C and 24A-B.

Although FIG. 20 shows controller 2001, FIG. 20 is intended more as a functional description of the various features that may be present in a controller than as a structural schematic of the embodiments described herein. In practice, and as recognized by those of ordinary skill in the art, items shown separately could be combined and some items could be separated.

Figure 21:
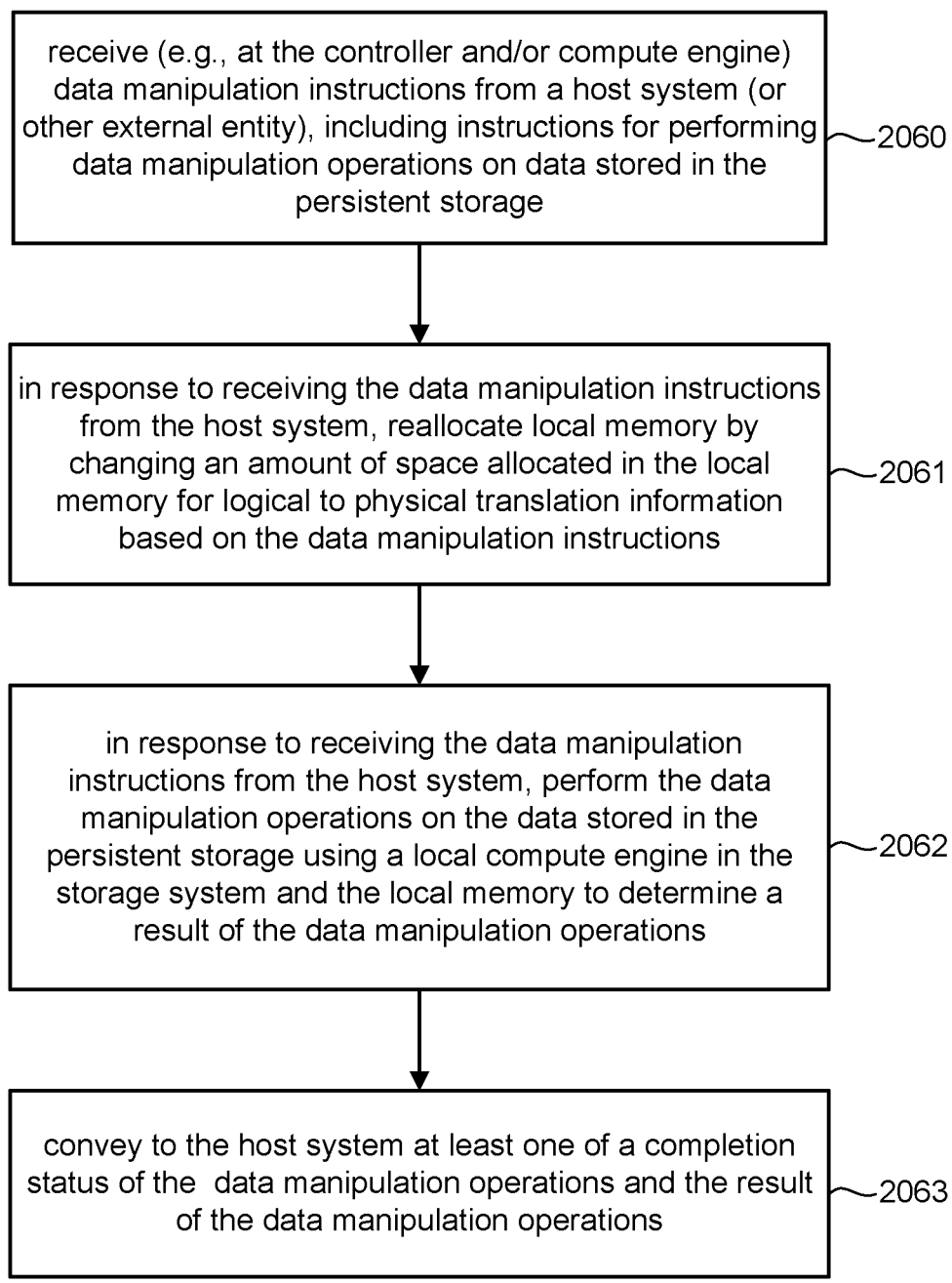
FIG. 21 is a flow chart describing one embodiment of a process for performing data manipulation operations.

FIG. 21 is a flow chart describing one embodiment of a process for performing data manipulation operations using any of the various apparatus described above with respect to FIGS. 1-20. It is noted while host system is used in the description for these examples, any other entities external to the storage device/system can be substituted in place of the host system. The process of FIG. 21 is performed in response to a host sending a set of data manipulation instructions (e.g., via an API) to the SSD (or other memory apparatus) for a compute engine to perform data manipulation operations on data stored in the persistent/non-volatile storage. In step 2060, data manipulation instructions are received at the SSD (or other memory system) from a host system (or other external entity). The data manipulation instructions include instructions for performing data manipulation operations on data stored in the persistent storage. The persistent storage referred to herein can be any of the non-volatile storage of the memory packages or memory dies discussed above (e.g., see FIGS. 1, 2, 5, 6-10, and 12-19), as well as other persistent storage. In one embodiment, the data manipulation instructions are received at the controller and forwarded to the compute engine. In another embodiment, the data manipulation instructions are received directly by the compute engine without the instructions first going to the controller.

In step 2061, in response to receiving the data manipulation instructions from the host system, the SSD reallocates the local memory (see e.g., any of local memories 16, 106, 406, 456, 606, 806, 856, 886, 954, and 2023 described above) by changing an amount of space allocated in the local memory for logical to physical translation information based on the data manipulation instructions. More details of step 2061 are provided below with respect to FIGS. 22A-B and 23A-C.

In step 2062, in response to receiving the data manipulation instructions from the host system, the local compute engine in the memory/storage system performs the data manipulation operations on the data stored in the persistent storage, with the compute engine using the local memory to perform its data manipulation operations. For example, the compute engine may use the local memory to store data during calculations, store results of calculations or operations, etc. The compute engine determines a result of the data manipulation operations. For example, if the data manipulation operations include searching a large amount of data for records that meet certain criteria, then the result of the data manipulation operations includes the records that meet the provided criteria. The data manipulation operations can be any of the operations discussed above.

In step 2063, controller conveys to the host system at least one of a completion status of the data manipulation operations and the result of the data manipulation operations. In most cases, the result of the data manipulation operations sent to the host is significantly smaller in size than the data accessed from the persistent storage and used to perform the data manipulation operations in step 2062.

Figure 22A:
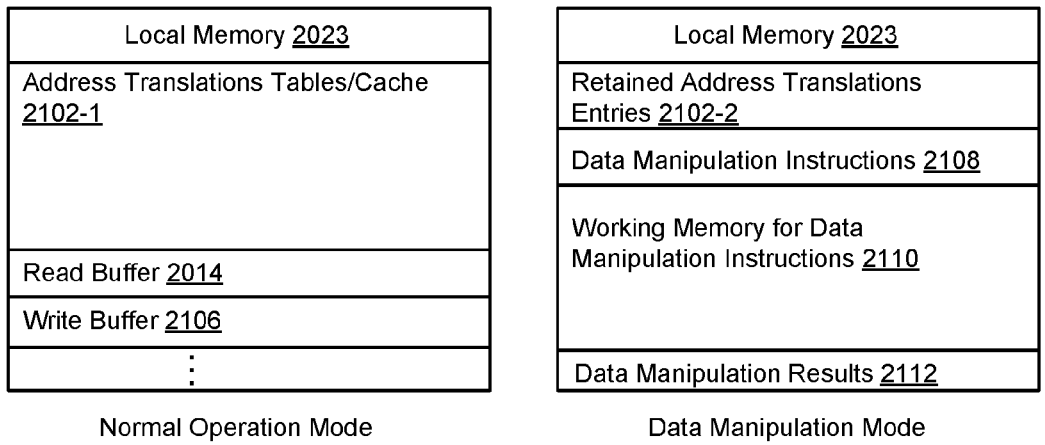
FIG. 22A includes block diagrams of local memory, depicting how the local memory is reallocated when performing data manipulation operations.
Figure 22B:
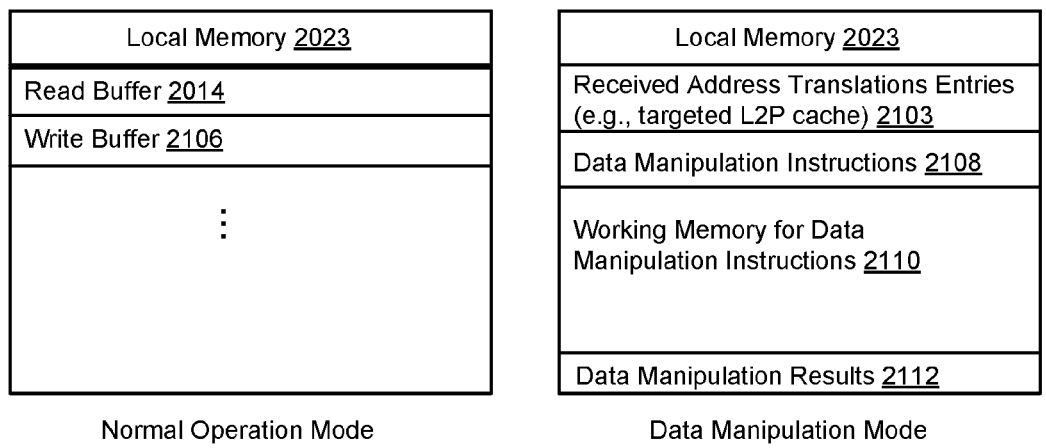
FIG. 22B includes block diagrams of local memory, depicting how the local memory is reallocated when performing data manipulation operations.

FIGS. 22A and 22B provide block diagrams of an example of local memory, depicting how the local memory is reallocated (step 2061) when performing data manipulation operations. In particular, FIG. 22A illustrates example data that may be stored in local memory (see e.g., any of local memories 16, 106, 406, 456, 606, 806, 856, 886, 954, and 2023 described above) of a storage system in accordance with a device-based flash translation layer (FTL) implementation—e.g., where logical-to-physical address translation is performed by the storage device (e.g., in the SSD) or one or more components of the storage device such as a controller. In device-based FTL implementations, commands from a host system to perform memory operations generally specify logical addresses (also herein called logical address information), and the host generally does not perform any logical to physical address translation. It is noted that the term "logical addresses" refers to logical addresses in an address space (e.g., a logical address space) of a host system, while the term "physical addresses" refers to physical addresses in an address space (e.g., a physical address space) of a storage system or storage device. FIG. 22A illustrates example data that may be stored in local memory during a normal operation mode, as well as example data that may be stored in the local memory during a data manipulation mode.

With reference to the normal operation mode in FIG. 22A, in some device-based FTL implementations, a controller receives, in a normal operation mode, commands from a host system to perform memory operations (e.g., read, write, and/or erase) on data stored in persistent storage. The host commands specify logical address information for the stored data on which the memory operations are to be performed. In some embodiments, in the normal operation mode, local memory 2023 (which can represent any of the memories described above) stores an address translation table 2102-1 (or a cache of address translation information or entries). In some embodiments, address translation table 2102-1 associates logical addresses with respective physical addresses for respective portions of persistent storage. The controller uses address translation table 2102-1 to map the logical addresses specified by the host command to corresponding physical addresses at which the data is stored in persistent storage.

In some embodiments, in the normal operation mode, at least a portion of local memory 2023 is used as a read buffer 2104 for read operations. For example, in response to a command from a host system to read data from one or more logical addresses, the controller uses address translation table 2102-1 to determine one or more respective physical addresses of respective portions of persistent storage corresponding to the one or more logical addresses. In some embodiments, the controller reads data from the determined one or more physical addresses and stores the data read in read buffer 2104, where the data is made available to the host system.

In some embodiments, in the normal operation mode, at least a portion of local memory 2023 is used as a write buffer 2106 for write operations. In one example, a host system sends a write command to the controller (e.g., via host interface 2024, FIG. 20), where the write command includes data to be written and specifies one or more logical addresses to which the data is to be written. In some embodiments, the data to be written is held in write buffer 2106. In some embodiments, the controller uses address translation table 2102-1 to determine one or more respective physical addresses of respective portions of persistent storage corresponding to the one or more logical addresses and writes the data from write buffer 2106 to the determined one or more physical addresses in persistent storage.

With reference to the data manipulation mode in FIG. 22A, in some device-based FTL implementations, a controller receives data manipulation instructions from a host system to perform data manipulation operations (e.g., computations, such as scanning, filtering, aggregating, sorting, joining or grouping) on data stored in persistent storage. In some embodiments, the controller changes to a data manipulation mode of operation in response to receiving the data manipulation instructions. In some embodiments, prior to receiving the data manipulation instructions, local memory 2023 stores address translation table 2102-1 (e.g., including a plurality of L2P entries mapping logical addresses to physical addresses) and optionally read buffer 2104 and/or write buffer 2106.

In some embodiments, in response to receiving the data manipulation instructions, the controller (or one or more components of the controller such as a computing module) reallocates (see step 2061 of FIG. 21) the local memory for execution of the data manipulation instructions. In some embodiments, data stored in read buffer 2104 is evicted from local memory 2023 (e.g., because the data stored in read buffer 2104 can later be retrieved again from persistent storage), and the portion of local memory used for read buffer 2104 is reallocated for data manipulation. In some embodiments, data stored in write buffer 2106 is transferred to persistent storage (e.g., the write operation is completed) and the portion of local memory 2023 used for write buffer 2106 is reallocated for data manipulation.

In device-based FTL implementations, the data manipulation instructions specify one or more logical addresses corresponding to the data on which the data manipulation operations are to be performed. In some embodiments, in response to receiving the data manipulation instructions, the controller determines one or more relevant L2P entries associated with the one or more logical addresses used by the data manipulation instructions (e.g., corresponding to the data to be processed). In some embodiments, the relevant L2P entries (e.g., those used by the data manipulation instructions) are a subset of the L2P entries in the address translation table. In some embodiments, the controller retains the relevant L2P entries in local memory and evicts from local memory (or otherwise ceases to store in local memory) at least a subset of the L2P entries not specified or not used by the data manipulation instructions.

As illustrated in the data manipulation mode in FIG. 22A, in response to receiving the data manipulation instructions (and after reallocation), local memory 2023 stores, in the data manipulation mode, the retained address translation entries 2102-2 (e.g., the relevant L2P entries) and the data manipulation instructions 2108 received from the host. In addition, a portion of local memory 2023 is allocated as working memory 2110 for execution of data manipulation instructions 2108 (e.g., by a computing module, such as computing module 2010, FIG. 20). In some embodiments, the controller (or computing module) performs the data manipulation operations on the stored data in accordance with data manipulation instructions 2108 and determines a result 2112 of the data manipulation operations. In some embodiments, the data manipulation result 2112 is stored in local memory 2023 (e.g., in a portion of the working memory 2110).

As can be seen from the change in local memory 2023 between normal operation mode and data manipulation mode of FIG. 22A, the reallocation of local memory 2023 includes changing the amount of space allocated in the local memory for logical to physical translation information based on the one or more data manipulation instructions. In the embodiment of FIG. 22A, the amount of space allocated in the local memory for logical to physical translation information is changed by reducing space in the local memory allocated to address translation. The space in the local memory allocated to address translation is reduced by removing address translation information from the local memory for logical addresses not accessed by the one or more data manipulation instructions. In one embodiment, the memory system removes address translation information from the local memory for all logical addresses in the cache that are not accessed by the one or more data manipulation instructions.

FIG. 22B illustrates example data that may be stored in local memory 2023 in accordance with a host-based flash translation layer (FTL) implementation—e.g., where logical-to-physical address translation is performed at least in part by a host system. FIG. 22B illustrates example data that may be stored in local memory during a normal operation mode, as well as example data that may be stored in the local memory during a data manipulation mode.

With reference to the normal operation mode in FIG. 22B, in some host-based FTL implementations, a controller receives, in a normal operation mode, commands from a host system to perform memory operations (e.g., read, write, and/or erase) on data stored in persistent storage. In some host-based FTL implementations, a logical-to-physical address translation table is stored at the host system (e.g., rather than in the storage device, such as in local memory 2023), and the host system performs the logical-to-physical address translation to determine the physical addresses at which the data is stored. Stated another way, in some such embodiments, the host system executes applications, which use logical addresses to specify the data on which operations are to be performed, and also performs logical-to-physical address translation to determine the physical addresses at which the data is stored.

In some embodiments, in the normal mode of operation, at least a portion of local memory 2023 is used as a read buffer 2104 for read operations and/or a write buffer 2106 for write operations. For example, in response to a host read command, the controller reads data from one or more physical addresses in persistent storage (e.g., specified by the host read command, in a host-based FTL implementation) and stores the read data in read buffer 2104, where the read data is made available to the host system. In another example, a host system sends a write command to the controller (e.g., via host interface 2024, FIG. 20), where the write command includes data to be written and specifies one or more physical addresses to which the data is to be written. In some embodiments, the data to be written is held in write buffer 2106 (e.g., for further processing) before being written to persistent storage.

With reference to the data manipulation mode in FIG. 22B, in some host-based FTL implementations, a controller receives data manipulation instructions from a host system to perform data manipulation operations on data stored in persistent storage. In some embodiments, the controller changes to a data manipulation mode of operation in response to receiving the data manipulation instructions. In some embodiments, prior to receiving the data manipulation instructions, local memory 2023 stores read buffer 2104 and/or write buffer 2106. In some embodiments, in response to receiving the data manipulation instructions, the portions of local memory 2023 allocated to read buffer 2104 and/or write buffer 2106 are reallocated for execution of the data manipulation instructions, as described above with reference to FIG. 22A.

In some embodiments, the data manipulation instructions, or more specifically the instructions for performing the data manipulation operations on the stored data, use logical addresses to identify the stored data. As mentioned above, the logical-to-physical address translation table may be stored at the host system. Thus, in some embodiments, the host system determines which address translation information (e.g., which L2P entries of an address translation table) is needed for performing address translation to map the logical addresses used by the data manipulation instructions to corresponding physical addresses for the stored data. In some embodiments, the host system includes the relevant address translation information (e.g., the relevant L2P entries) in or with the data manipulation instructions.

As illustrated in the data manipulation mode in FIG. 22B, in response to receiving the data manipulation instructions (and after reallocation), local memory 2023 stores, in the data manipulation mode, the received address translation entries 2103 (e.g., the relevant L2P entries referenced by the instructions for the data manipulation operations) and the data manipulation instructions 2108 received from the host. It is noted that received address translation entries 2103 are sometimes herein collectively called the L2P cache in local memory. In addition, as described above with reference to the data manipulation mode in FIG. 22A, in some embodiments a portion of local memory 2023 is allocated as working memory 2110 for execution of data manipulation instructions 2108, and a result of the data manipulation operations performed on the stored data is optionally stored in local memory 2023 (e.g., in a portion of the working memory 2110).

As can be seen from the change in local memory 2023 between normal operation mode and data manipulation mode of FIG. 22B, the reallocation of local memory 2023 includes changing the amount of space allocated in the local memory for logical to physical translation information based on the one or more data manipulation instructions. In the embodiment of FIG. 22B, the amount of space allocated in the local memory for logical to physical translation information is changed by increasing the space allocated in the local memory for logical to physical translation information from zero to a positive number. This is accomplished by adding L2P cache entries (the for logical to physical translation information received from the host) associated with the one or more data manipulation instructions to the local memory, so the local memory transitions from no logical to physical translation information to some logical to physical translation information 2013. In one embodiment, L2P cache entries associated with the one or more data manipulation instructions are the L2P cache entries for logical addresses accessed by (or otherwise used by) the one or more data manipulation instructions.

It is noted that the items in FIGS. 22A and 22B are not drawn to scale. For example, in a typical implementation, the amount of local memory 2023 required for the retained address translation entries 2102-2 and data manipulation instructions 2108 is much less than the amount of local memory 2023 allocated as working memory 2110. In some embodiments, working memory 2110 is used to temporarily store data read from non-volatile memory, intermediate results generated by data manipulation instructions 2108, as well as the results 2112 that are reported to or made available to the host system that provided the data manipulation instructions 2108.

Figure 23A:
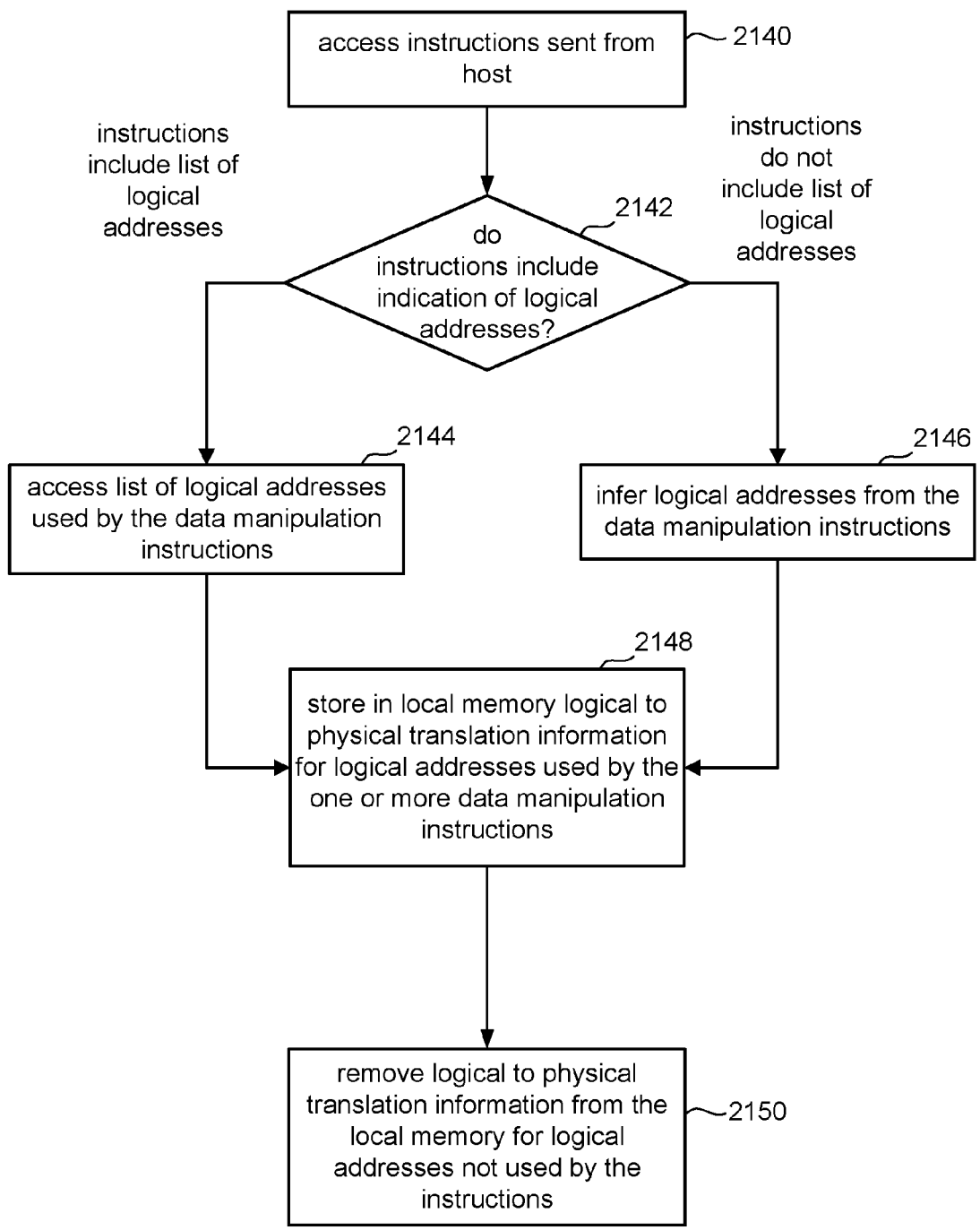
FIG. 23A is a flow chart describing one embodiment of a process for reallocating local memory when performing data manipulation operations.

FIG. 23A is a flow chart describing one embodiment of a process for reallocating local memory when performing data manipulation operations. The process of FIG. 23A provides more details of one example implementation of step 2061 of FIG. 21. The process of FIG. 23A can be performed by a controller and/or a compute engine of any of the embodiments of FIGS. 1-20. FIG. 23A describes reallocating local memory for the device-based FTL implementations of FIG. 22A. In step 2140 of FIG. 23A, the data manipulation instructions from the host (received in step 2060 of FIG. 21) are accessed. In some embodiments, the data manipulation instructions will include an indication of logical addresses used or accessed by the data manipulation instructions. For example, a list (or other data structure) of logical addresses (or other data structure) will be provided with the data manipulation instructions. If the data manipulation instructions include an indication of logical addresses (step 2142), then that list of logical addresses used by the data manipulation instructions is accessed in step 2144. If the data manipulation instructions do not include an indication of logical addresses (step 2142), then the logical addresses used or accessed by the data manipulation instructions will be inferred by scanning the data manipulation instructions in step 2146. Logical to physical translation information for logical addresses used or accessed by the one or more data manipulation instructions is stored (including continued to be stored) in the local memory in step 2148 (after either of steps 2144 or 2146). In step 2150, logical to physical translation information for logical addresses not used by the instructions is removed (or evicted) from the local memory. As a result of steps 2148 and 2150, the local memory is reallocated from normal operation mode to data manipulation mode, as depicted in FIG. 22A with Address Translations Tables/Cache 2102-1 being replaced by Retained Address Translations Entries 2102-2, resulting in smaller amount of space in the local memory being used for logical to physical translation information and more space in the local memory being available to the compute engine to support data manipulation instructions (e.g., Working Memory for Data Manipulation Instructions 2110).

Figure 23B:
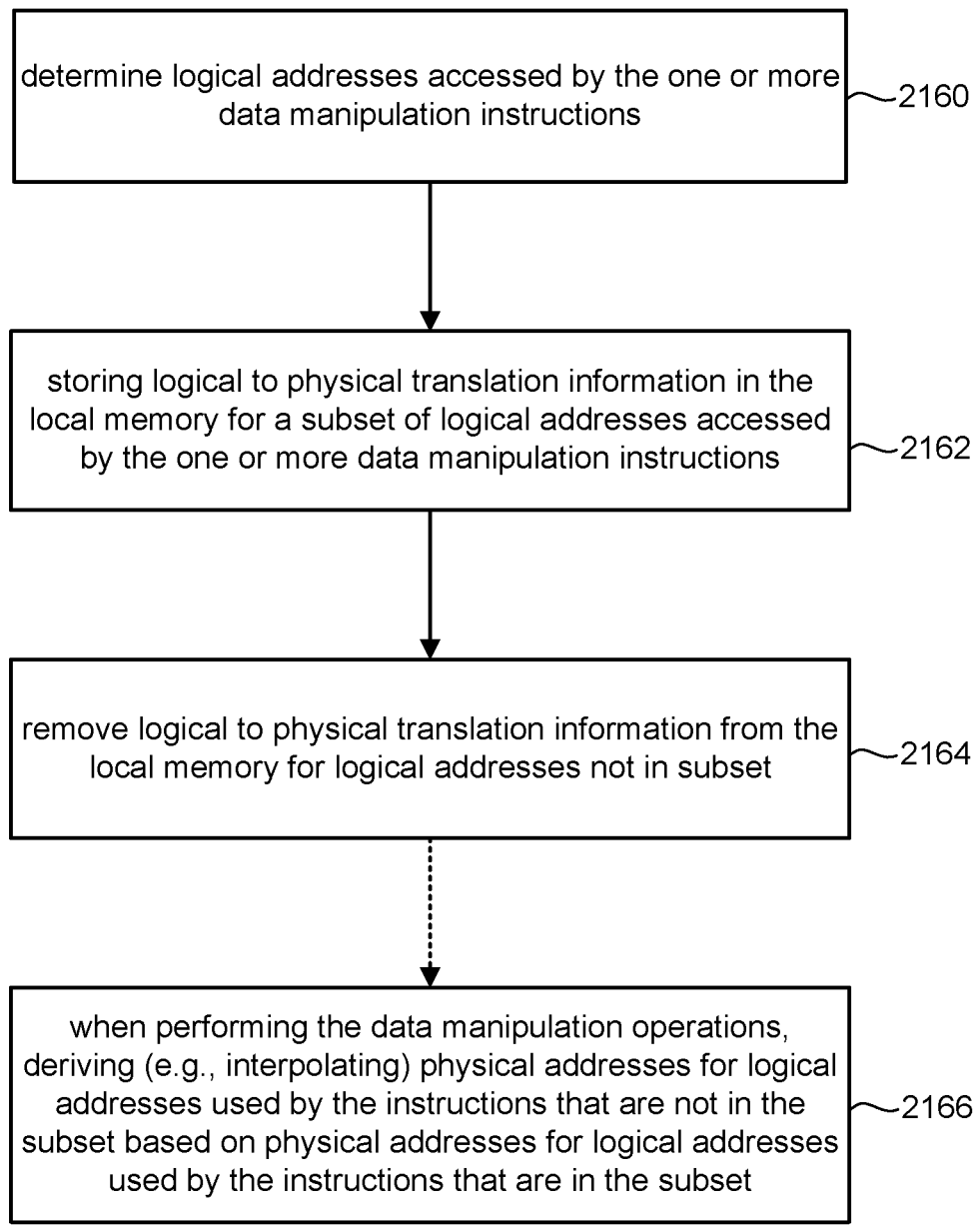
FIG. 23B is a flow chart describing one embodiment of a process for reallocating local memory when performing data manipulation operations.

FIG. 23B is a flow chart describing another embodiment of a process for reallocating local memory when performing data manipulation operations. The process of FIG. 23A provides more details of another example implementation of step 2061 of FIG. 21. The process of FIG. 23A can be performed by a controller and/or a compute engine of any of the embodiments of FIGS. 1-20. FIG. 23B describes reallocating local memory for the device-based FTL implementations of FIG. 22A. In step 2160 of FIG. 23B, the SSD (e.g., the controller and/or compute engine) determines the logical addresses used or accessed by the one or more data manipulation instructions from a received list (similar to step 2144 of FIG. 23A) or by inferring (similar step 2146 of FIG. 23A). In step 2162, logical to physical translation information is stored in the local memory for a subset of logical addresses accessed by the one or more data manipulation instructions. In one embodiment, the one or more data manipulation instructions are accessing a sequence of logical addresses or a sequence of physical addresses. Therefore, to save room in the memory, the memory only needs to store the start and end of the sequence of logical addresses and physical addresses (or another subset that indicate the full set). In step 2164, logical to physical translation information for logical addresses not in the subset are removed from the local memory. As a result of steps 2162 and 2164, the local memory is reallocated from normal operation mode to data manipulation mode, as depicted in FIG. 22A with Address Translations Tables/Cache 2102-1 being replaced by Retained Address Translations Entries 2102-2 (ie the subset), resulting in small amount of space in the local memory being used for logical to physical translation information and more space in the local memory being available to the compute engine to support data manipulation instructions (e.g., Working Memory for Data Manipulation Instructions 2110).

When performing the data manipulation operations (see step 2062 of FIG. 21), the controller and/or compute engine derives (e.g., interpolates) physical addresses for logical addresses used by the instructions that are not in the subset based on physical addresses for logical addresses used by the instructions that are in the subset. In one example, if the system knows the start and end of a sequence of logical and/or physical addresses, then it can interpolate the remainder of the sequence.

Figure 23C:
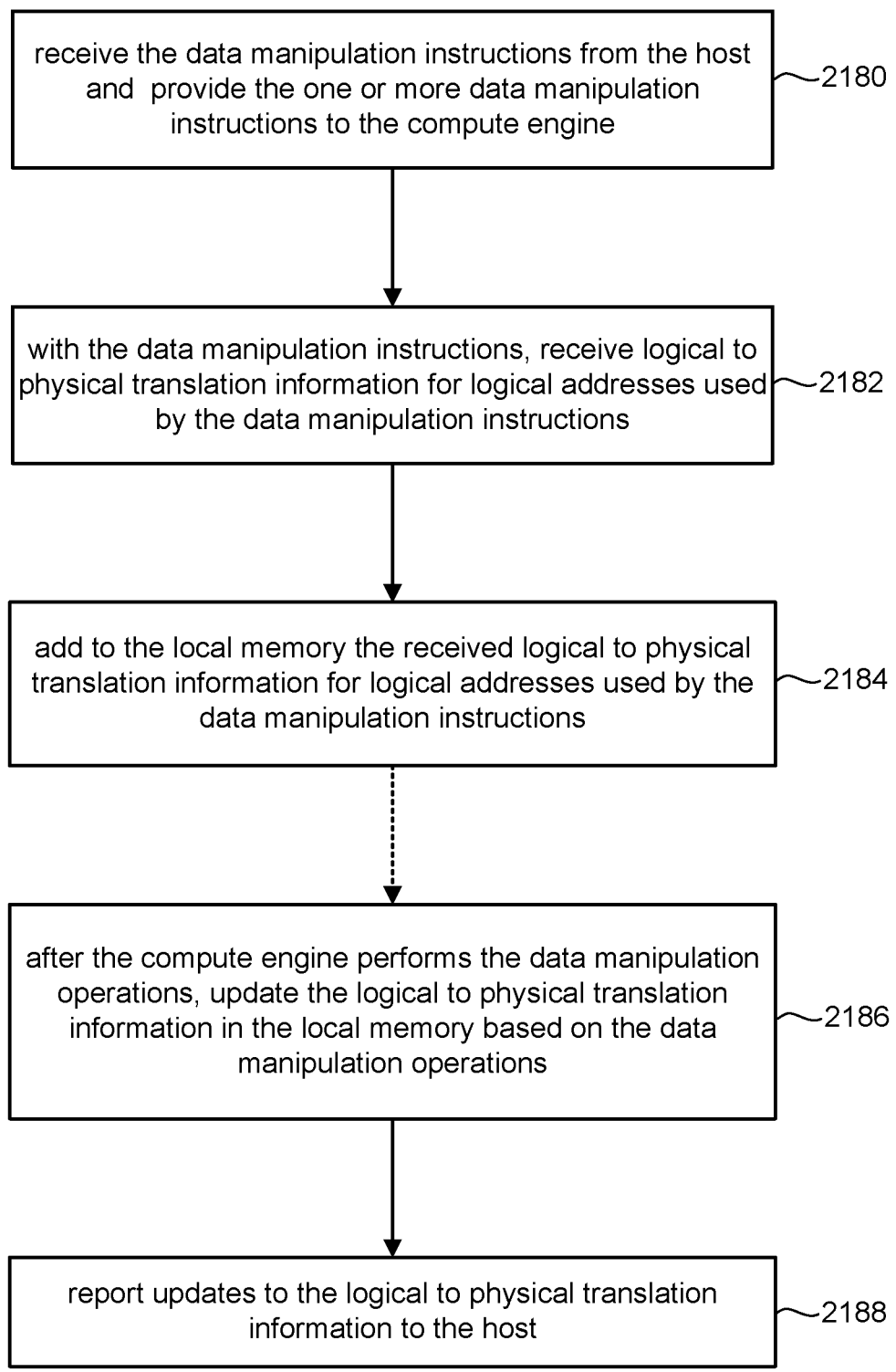
FIG. 23C is a flow chart describing one embodiment of a process for reallocating local memory when performing data manipulation operations.

FIG. 23C is a flow chart describing another embodiment of a process for reallocating local memory when performing data manipulation operations. The process of FIG. 23A provides more details of another example implementation of step 2061 of FIG. 21. The process of FIG. 23A can be performed by a controller and/or a compute engine of any of the embodiments of FIGS. 1-20. FIG. 23C describes reallocating local memory for the host-based FTL implementations of FIG. 22B. In step 2180 of FIG. 23C, the controller receives data manipulation instructions from the host and provides the one or more data manipulation instructions to the compute engine. In step 2182, logical to physical translation information for logical addresses used by the data manipulation instructions is received with the data manipulation instructions. In step 2184, the received logical to physical translation information for logical addresses used by the data manipulation instructions are added to the local memory (see, e.g., Received Address Translations Entries 2103 of FIG. 22B).

In step 2186, after the compute engine performs the data manipulation operations (see step 2062 of FIG. 21), the logical to physical translation information in the local memory is updated based on the data manipulation operations. That is, some L2P entries may be updated to reflect writing or movement of data. In step 2188, the controller reports updates of the logical to physical translation information to the host. Step 2188 is performed because, in this embodiment, the host is maintaining the L2P tables.

Figure 24A:
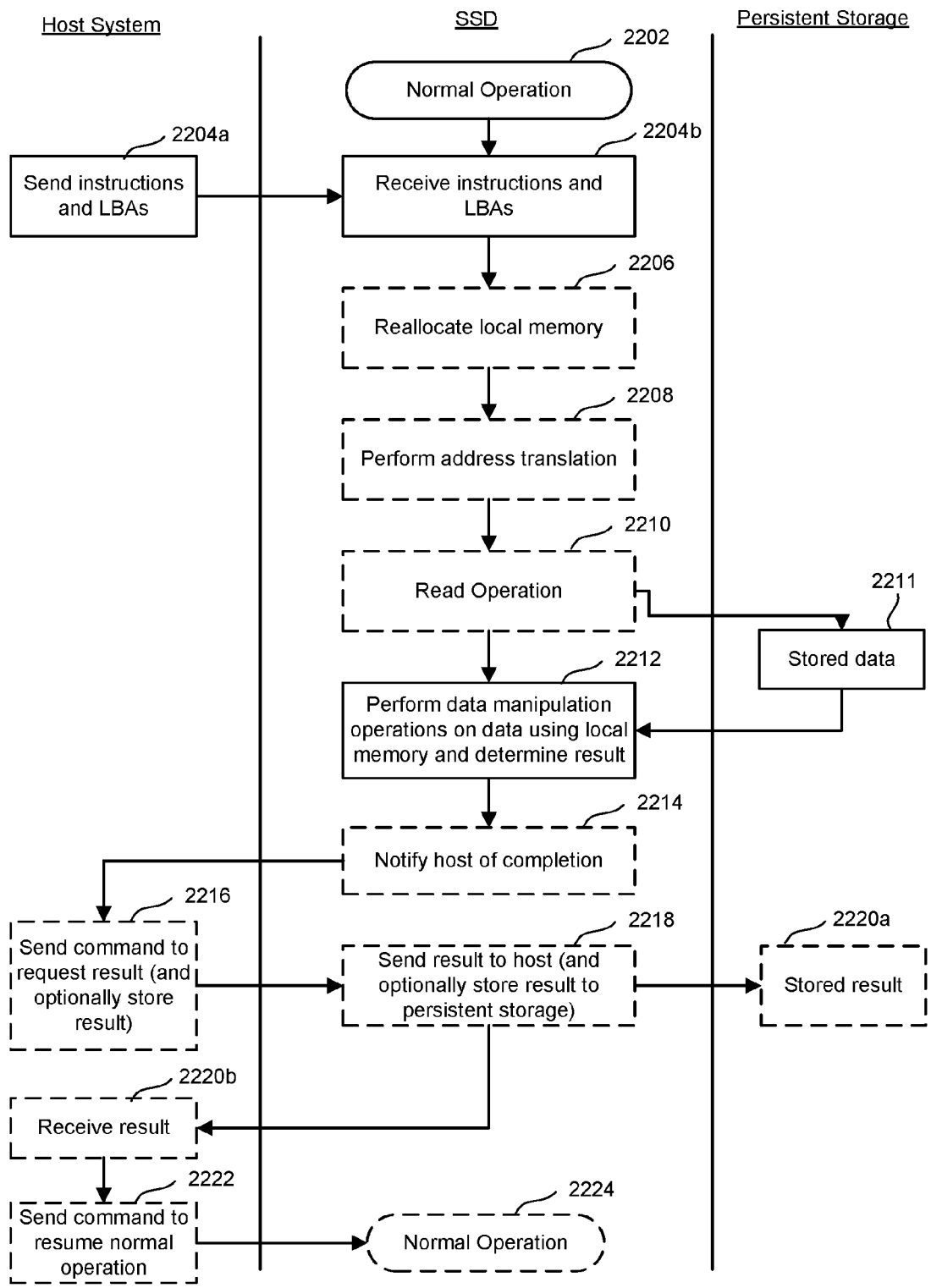
FIG. 24A is a flow chart describing one embodiment of a process for performing data manipulation operations.

FIG. 24A illustrates a conceptual flowchart representation of a method of performing data manipulation operations in a storage system, in accordance with some embodiments. In particular, FIG. 24A illustrates a method of performing data manipulation operations using a device-based FTL implementation (see FIGS. 22A, 23A and 23B). In some embodiments, the method of FIG. 24A is performed by a storage device (e.g., an SSD) or one or more components of the storage device such as a controller and/or a compute engine in communication with or included in the controller. In some embodiments, the method of FIG. 24A is governed by instructions that are stored in a non-transitory computer readable storage medium and that are executed by one or more processors of a device, such as the one or more processing units (CPUs) 2022 (FIG. 20) or a compute engine. In some embodiments, the operations are performed, at least in part, by a host communication module (e.g., host communication module 2030, FIG. 20), a data read module (e.g., data read module 2032, FIG. 20), a data write module (e.g., data write module 2034, FIG. 20), a computing module manager (e.g., computing module manager 2040, FIG. 20) or a component of the computing module manager (e.g., local memory reallocation module 2042, FIG. 20), and a flash translation layer (FTL) module (e.g., FTL module 2044, FIG. 20).

In some embodiments, some of the operations (or alternatively, steps) of FIG. 24A are performed at a host system that is operatively coupled with the storage device (e.g., through the "PCIe Interface to Host," or host interface 2024, FIG. 20), and other operations are performed at the storage device. In some of these embodiments, the method is governed, at least in part, by instructions that are stored in a non-transitory computer readable storage medium and that are executed by one or more processors (e.g., hardware processors) of the host system. For ease of explanation, the following describes a method as performed by a controller that includes or is in communication with a compute engine and that is coupled with local memory. The method of FIG. 24A could also be performed partly or entirely by a compute engine.

The method begins, in some embodiments, with the controller operating in a normal mode of operation, as described above with reference to the normal operation mode of FIG. 22A.

A host system sends (2204a), and the controller receives (2204b), data manipulation instructions including instructions for performing data manipulation operations on data stored in the persistent storage and logical addresses (LBAs) for the stored data.

In some embodiments, in response to receiving the data manipulation instructions, the compute engine or the controller reallocates (2206) the local memory (e.g., local memory 2023 is reallocated from the allocation shown for the normal operation mode to the allocation shown for the data manipulation mode, as described above with reference to FIG. 22A). In some embodiments, the reallocating includes changing the amount of space allocated in the local memory for logical to physical translation information based on the one or more data manipulation instructions.

Next, in some embodiments, the controller module performs (2208) address translation using the LBAs specified in the data manipulation instructions to determine corresponding physical addresses for the data stored in persistent storage (e.g., using retained address translation entries 2102-2, FIG. 22A).

In some embodiments, the controller performs (2210) at least one read operation to read the stored data (2211) from persistent storage. In some embodiments, after being read from persistent storage, the read data is stored in local memory (e.g., in working memory 2110 for executing data manipulation instructions, FIG. 22A) for use in executing the one or more data manipulation operations.

Next, the compute engine performs (2212) the data manipulation operations on the stored data (2211) using the local memory (e.g., using working memory 2110, FIG. 22A) to determine a result of the data manipulation operations. In some embodiments, the result is stored in local memory (e.g., data manipulation result(s) 2112, FIG. 22A).

In some embodiments, the computer engine notifies (2214) the host system that the data manipulation operations have been completed (e.g., the compute engine conveys to the host a completion status).

In response to the notification of the completion status, in some embodiments the host system sends (2216) a command to request the result of the data manipulation operations, and optionally to store the result to persistent storage (e.g., in device-based FTL implementations, the host system specifies one or more LBAs, and the computing module performs address translation to determine one or more corresponding physical addresses to which to store the data manipulation result).

In response to a host command for the result of the data manipulation operations (2216), the compute engine and/or controller returns (2218) the result (e.g., data manipulation result 2112, FIG. 22A) to the host system (2220b). If the host system also instructs to store the result to persistent storage, the controller and/or compute engine writes (2218) the result to persistent storage (2220a).

In some embodiments, after receiving the result of the data manipulation operations (2220b), the host system sends (2222) a command for the controller to resume normal operation. In response, the controller resumes (2224) normal operation (e.g., the controller reallocates the local memory to an allocation configured for normal operation, such as by restoring evicted portions of address translation table 2102-1, FIG. 22A).

Figure 24B:
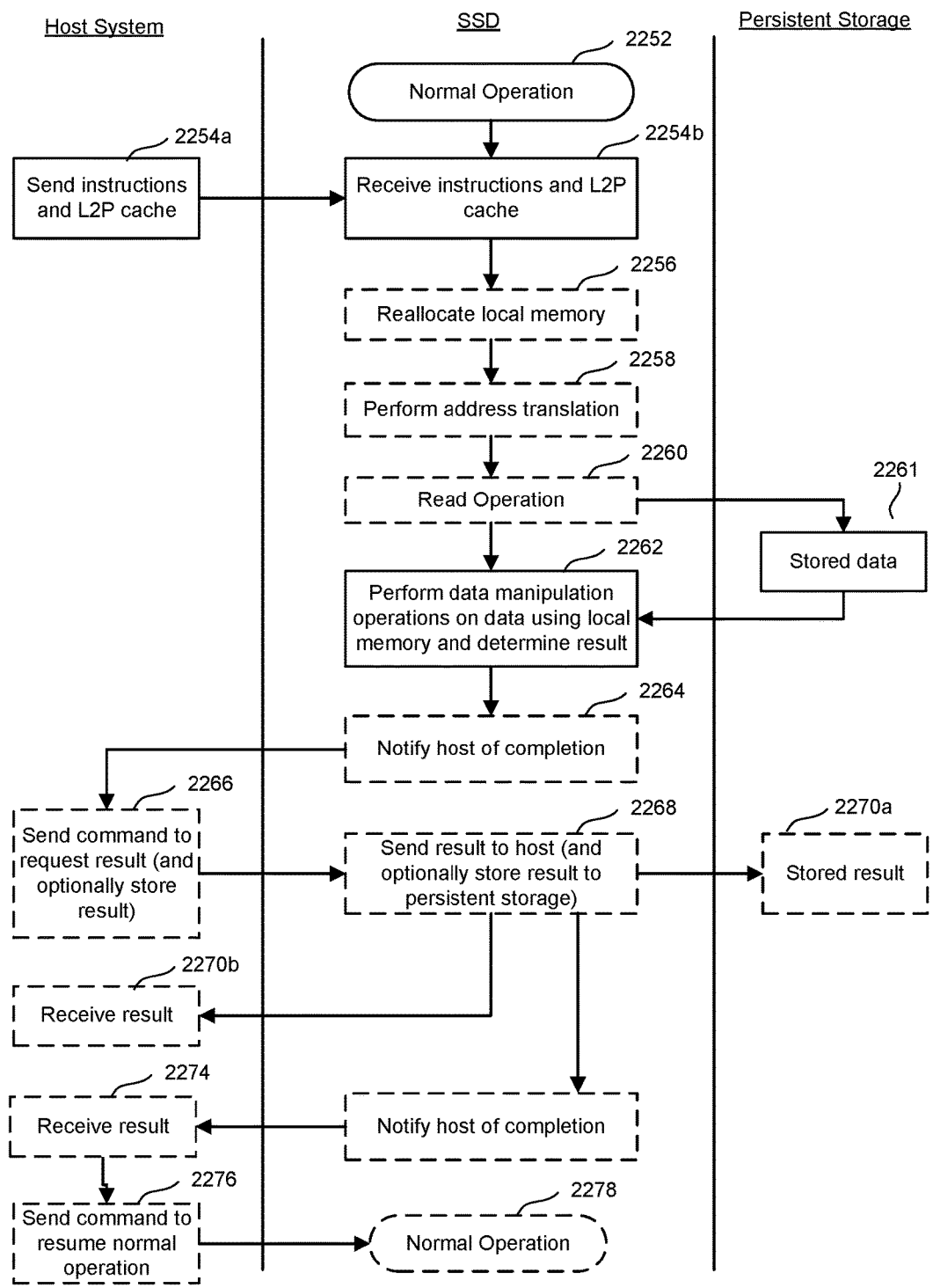
FIG. 24B is a flow chart describing one embodiment of a process for performing data manipulation operations.

FIG. 24B illustrates a conceptual flowchart representation of a method of performing data manipulation operations in a storage system, in accordance with some embodiments. In particular, FIG. 24B illustrates a method of performing data manipulation operations using a host-based FTL implementation (see FIG. 22B). In some embodiments, the method of FIG. 24B is performed by a storage device (e.g., an SSD) or one or more components of the storage device such as a controller and/or compute engine in communication with or included in the controller. In some embodiments, the method of FIG. 24B is governed by instructions that are stored in a non-transitory computer readable storage medium and that are executed by one or more processors of a device. In some embodiments, the operations of FIG. 24B are performed, at least in part, by a host communication module (e.g., host communication module 2030, FIG. 20), a data read module (e.g., data read module 2032, FIG. 20), a data write module (e.g., data write module 2034, FIG. 20), a computing module manager (e.g., computing module manager 2040, FIG. 20) or a component of the computing module manager (e.g., local memory reallocation module 2042, FIG. 20), and an address translation module (e.g., address translation module 2050, FIG. 20).

In some embodiments, some of the operations (or alternatively, steps) are performed at a host system that is operatively coupled with the storage device (e.g., through the PCIe Interface to Host 150 of FIG. 3, or host interface 2024 of FIG. 20), and other operations are performed at the storage device. In some of these embodiments, the method of FIG. 24B is governed, at least in part, by instructions that are stored in a non-transitory computer readable storage medium and that are executed by one or more processors (e.g., hardware processors) of the host system. For ease of explanation, the following describes a method as performed by a controller that includes or is in communication with a compute engine and that is coupled with local memory. The method of FIG. 24B could also be performed partly or entirely by a compute engine.

The method begins, in some embodiments, with the controller operating in a normal mode of operation, as described above with reference to the normal operation modes in FIG. 22B.

A host system sends (2254a), and the controller receives (2254b), data manipulation instructions including instructions for performing data manipulation operations on data stored in the persistent storage (e.g., the processing operation instructions are stored in local memory 2023 as part of data manipulation instructions 2108, FIG. 22B) and logical-to-physical address translation information (L2P cache entries) for the stored data (e.g., the L2P cache entries are stored in local memory 2023 as received address translation entries 2103, FIG. 22B) accessed by the data manipulation instructions.

In some embodiments, in response to receiving the data manipulation instructions, the controller or compute engine reallocates (2256) the local memory (e.g., local memory 2023 is reallocated from the allocation shown for the normal operation mode to the allocation shown for the data manipulation mode, as described above with reference to FIG. 22B). In some embodiments, the reallocating includes changing the amount of space allocated in the local memory for logical to physical translation information based on the one or more data manipulation instructions.

Next, in some embodiments, the controller performs (2258) address translation using the L2P cache provided in the data manipulation instructions from the host system to determine corresponding physical addresses for the data stored in persistent storage. For example, in some embodiments, the processing operation instructions use logical addresses, and the computing module performs address translation using the L2P cache provided by the host to translate the logical addresses into physical addresses at which the data is stored in persistent storage.

In some embodiments, the controller performs (2260) at least one read operation to read the stored data (2261) from persistent storage. In some embodiments, after being read from persistent storage, the read data is stored in local memory (e.g., in working memory 2110 for executing data manipulation instructions, FIG. 22B) for use in executing the one or more data manipulation operations.

Next, the compute engine performs (2262) the data manipulation operations on the stored data (2261) using the local memory (e.g., using working memory 2110, FIG. 22B) to determine a result of the data manipulation operations. In some embodiments, the result is stored in local memory (e.g., data manipulation result(s) 2112, FIG. 22B).

In some embodiments, the controller or compute engine notifies (2264) the host system that the data manipulation operations have been completed (e.g., the computing module conveys to the host a completion status).

In response to the notification of the completion status, in some embodiments the host system sends (2266) a command to request the result of the data manipulation operations, and optionally to store the result to persistent storage (e.g., in host-based FTL implementations, the host system may specify one or more logical addresses (e.g., LBAs) to which to store the result and also provide the corresponding L2P entries, and the controller allocates physical addresses corresponding to the specified logical addresses, and stores (2270a) the data manipulation result in persistent memory at the allocated physical addresses).

In response to a host command for the result of the data manipulation operations (2266), the controller returns (2268) the result (e.g., data manipulation result 2112, FIG. 22B) to the host system (2270b). If the host system also instructs the controller to store the result to persistent storage, the controller writes (2268) the result to persistent storage (2270a).

In some embodiments, in accordance with a host-based FTL implementation, the controller updates (2272) the L2P cache stored in the local memory (e.g., updates the received address translation entries 2103, FIG. 22B) in accordance with storing the result to persistent storage (e.g., one or more of address translation entries 2103 are updated to include the one or more physical addresses in persistent storage, corresponding to one or more host-specified logical addresses, to which the data manipulation result is written, thereby updating the L2P cache in local memory).

In some embodiments, the host system receives (2274) the updated L2P cache, or the update portion of the L2P cache, from the controller. In some embodiments, the host system synchronizes its address translation tables with the updated L2P cache stored in the local memory of the controller (e.g., the host system requests the updated L2P cache), and in some embodiments, the controller automatically sends the updated L2P cache entries to the host system (e.g., the controller sends to the host system the updated L2P cache or updated L2P entries in conjunction with sending to the host system the result of the data manipulation operations).

In some embodiments, after receiving the result of the data manipulation operations (2270b) and optionally the updated L2P cache (2274), the host system sends (2276) a command for the controller to resume normal operation. In response, the controller resumes (2278) normal operation (e.g., the controller reallocates the local memory to an allocation configured for normal operation, as shown for example in FIG. 22B).

Those skilled in the art will recognize that a different ordering of the operations of the methods of FIGS. 21, 23A-C and 24A & B may be possible, and that variations of the ordering and combinations of operations are possible while achieving the same result. For example, in some embodiments, the result is stored to persistent storage prior to or in conjunction with notifying the host of completion of the data manipulation operations (e.g., in some embodiments, the data manipulation instructions from the host system further include instructions, and optionally addressing information, for writing the result(s) of the data manipulation to persistent storage after performing the data manipulation operations). In some embodiments, the host system obtains the result of the data manipulation operations by instructing the controller to resume normal operation and then sends the controller a (normal operation) read command to read the stored result from persistent storage (e.g., after the result is stored in persistent storage, the host system can obtain the stored result even when the controller is not in a data manipulation mode by sending a read command).

One embodiment includes a non-volatile storage system, comprising a controller; local memory in communication with the controller, non-volatile memory in communication with the controller and a compute engine in communication with the controller and the local memory. The compute engine is configured to receive one or more data manipulation instructions from an entity external to the non-volatile storage system and perform one or more data manipulation operations using the local memory on data stored in the non-volatile memory in response to the one or more data manipulation instructions. The local memory is configured such that an amount of space allocated in the local memory for logical to physical translation information is changed based on the one or more data manipulation instructions.

One embodiment includes a method of operating a storage system comprising persistent storage, a controller and a local memory for the controller, the method comprising: receiving at the controller, from a host system, data manipulation instructions including instructions for performing one or more data manipulation operations on data stored in the persistent storage; in response to receiving the data manipulation instructions from the host system, reducing space in the local memory allocated to address translation by removing address translation information for addresses not accessed by the data manipulation instructions; in response to receiving the data manipulation instructions from the host system, performing the one or more data manipulation operations on the data stored in the persistent storage using a local compute core in the storage system and the local memory for the controller to determine a result of the one or more data manipulation operations; and conveying to the host system at least one of a completion status of the one or more data manipulation operations and the result of the one or more data manipulation operations.

One embodiment includes a non-volatile storage system, comprising a non-volatile memory package comprising non-volatile memory and a compute core; a local memory; and means, in communication with the local memory (e.g., volatile memory) and the non-volatile memory package, for receiving instructions to perform data manipulation operations, causing the compute core to perform the data manipulation operations on data stored in the non-volatile memory and reallocating amount of space for logical to physical translation data in the local memory based on which logical addresses are used in the received instructions. In some embodiments, the means for receiving instructions, causing the compute core to perform the data manipulation operations and reallocating can be implemented by a controller and/or a compute engine. Examples in the discussion above include controller 12 (FIG. 1), controller 110 (FIG. 2), controller 402 (FIG. 7), controller 452 (FIG. 8), controller 602 (FIG. 10), controller 802 (FIG. 12), controller 852 (FIG. 13), controller 882 (FIG. 13A), controller 952 (FIG. 15), controller 2001 (FIG. 20), computer engine 22 (FIG. 1), compute engine 114 (FIG. 2), compute engine 412 (FIG. 7), compute engine 464 (FIG. 8), compute engine 616 (FIG. 10), compute engine 824 (FIG. 12), compute engine 862 (FIG. 13), compute engines 892 or 894 (FIG. 13A), compute engine 970 (FIG. 15), compute engine 2010 (FIG. 20), and CPUs 2022 (FIG. 20). These circuits perform the processes described in FIGS. 21, 22A, 22B, 23A, 23B, 23C, 24A and 24B.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A non-volatile storage system, comprising:
a controller comprising a processor;
local memory connected to the controller, the local memory is configured to store logical to physical translation information, the controller is configured to perform logical to physical translation of a logical address based on the logical to physical translation information stored in the local memory;
non-volatile memory connected to the controller; and
a compute engine connected to the controller and the local memory, the compute engine is separate from the processor, the compute engine is configured to:
receive one or more data manipulation instructions from an entity external to the non-volatile storage system, and
perform one or more data manipulation operations, using a working area in the local memory for the one or more data manipulation instructions, on data from the non-volatile memory in response to the one or more data manipulation instructions;
wherein the controller is further configured to reallocate space in the local memory in response to the received one or more data manipulation instructions by reducing space in the local memory allocated to logical to physical translation information including removing logical to physical translation information for logical addresses not accessed by the one or more data manipulation instructions and adding space in the local memory allocated for the working area for the one or more data manipulation instructions.

2. The non-volatile storage system of claim 1, wherein:
the controller is further configured to reallocate space in the local memory by receiving an indication of logical addresses with the one or more data manipulation instructions and removing logical to physical translation information from the local memory for logical addresses not included in the indication.

3. The non-volatile storage system of claim 1, wherein:
the controller is further configured to reallocate space in the local memory by inferring logical addresses accessed by the one or more data manipulation instructions and removing logical to physical translation information from the local memory for logical addresses not accessed by the one or more data manipulation instructions.

4. The non-volatile storage system of claim 1, wherein: the controller is further configured to determine logical addresses accessed by the one or more data manipulation instructions and store logical to physical translation information in the local memory for a subset of logical addresses accessed by the one or more data manipulation instructions and, during performance of the one or more data manipulation operations, derive physical addresses for logical addresses used by the instructions that are not in the subset based on physical addresses for logical addresses used by the instructions that are in the subset.

5. The non-volatile storage system of claim 1, wherein: the controller is further configured to:
  receive the one or more data manipulation instructions from the entity external to the non-volatile storage system and provide the one or more data manipulation instructions to the compute engine;
  receive, from the entity external to the non-volatile storage system, logical to physical translation information for logical addresses used by the one or more data manipulation instructions;
  change the amount of space allocated in the local memory for logical to physical translation information by adding the received logical to physical translation information for logical addresses used by the one or more data manipulation instructions to the local memory; and
  after the compute engine performs the data manipulation operations, update the logical to physical translation information in the local memory based on the data manipulation operations and report updates to the logical to physical translation information to the entity external to the non-volatile storage system.

6. The non-volatile storage system of claim 1, wherein: the controller is further configured to receive the one or more data manipulation instructions from the entity external to the non-volatile storage system and provide the one or more data manipulation instructions to the compute engine; and
the controller is further configured to convey to the entity external to the non-volatile storage system at least one of a completion status of the one or more data manipulation operations and the result of the one or more data manipulation operations.

7. The non-volatile storage system of claim 1, wherein: the local memory is further configured to store a result of the one or more data manipulation operations.

8. The non-volatile storage system of claim 1, further comprising:
  a memory package separate from and connected to the controller, the memory package includes: one or more non-volatile memory dies that comprise the non-volatile memory, the compute engine and an error correction engine;
  wherein the controller comprises a front end processor circuit and a back end processor circuit connected to the front end processor circuit, the memory package is connected to the back end processor circuit, the front end processor circuit is configured to implement a flash translation layer that performs the logical to physical translation, the back end processor circuit is configured to manage memory operations in the memory package at the request of the front end processor circuit.

9. The non-volatile storage system of claim 8, wherein: the controller further includes an additional compute engine; and
the additional compute engine is connected to the local memory.

10. The non-volatile storage system of claim 1, wherein: the non-volatile memory comprises a three dimensional memory structure in which multiple memory levels are formed above a single substrate, the compute engine is positioned on the substrate and below the three dimensional memory structure; and
the three dimensional memory structure, the substrate and the computer engine comprise a single memory die.

11. The non-volatile storage system of claim 1, wherein: the controller includes an interface to a host, the compute engine is positioned on a non-volatile memory side of the interface to the host.

12. A method of operating a storage system comprising persistent storage, a controller, a local compute core and a local memory for the controller, the persistent storage storing logical address to physical address translation tables, the local memory storing a cache for the logical address to physical address translation tables in the persistent storage, the method comprising:
  receiving at the controller, from a host system, data manipulation instructions including instructions for performing one or more data manipulation operations on data stored in the persistent storage, the data manipulation instructions refer to logical addresses;
  in response to receiving the data manipulation instructions from the host system, reallocating space in the local memory by reducing space in the local memory allocated to the cache for the logical address to physical address translation tables in the persistent storage including removing address translation information for logical addresses not accessed by the data manipulation instructions and adding space in the local memory allocated for a working area in the local memory for the one or more data manipulation operations;
  in response to receiving the data manipulation instructions from the host system, performing the one or more data manipulation operations on the data using the local compute core and the working area in the local memory to determine a result of the one or more data manipulation operations; and
  conveying to the host system at least one of a completion status of the one or more data manipulation operations and the result of the one or more data manipulation operations.

13. The method of claim 12, further comprising:
  storing a result of the one or more data manipulation operations in the local memory, the performing the one or more data manipulation operations uses address translation information stored in the local memory; and
  in response to performing the one or more data manipulation operations, updating the address translation information stored in the local memory.

14. The method of claim 12, wherein:
  the reducing space in the local memory allocated to the cache for the logical address to physical address translation tables in the persistent storage comprises removing address translation information for all logical addresses not accessed by the data manipulation instructions.

15. A non-volatile storage system, comprising:
a non-volatile memory package comprising non-volatile memory and a compute core, the non-volatile memory configured to store a plurality of L2P tables representing address translation information for translating between logical addresses and physical addresses;
a local memory that is separate from the non-volatile memory, the local memory is configured to store a L2P cache for the plurality of L2P tables stored in the non-volatile memory; and
means, in communication with the local memory and the non-volatile memory package, for:
  receiving instructions to perform data manipulation operations causing the compute core to perform the data manipulation operations on data read from the non-volatile memory and stored in a working area of the local memory for the data manipulation operations,
  in response to the received instructions, reallocating space in the local memory by reducing space allocated to the L2P cache including removing address translation information for logical addresses not accessed by the received instructions and adding space for the working area of the local memory for the data manipulation operations.

16. The non-volatile storage system of claim 15, wherein:
the means for reallocating space is configured to access an identification of logical addresses used by the instructions, store logical to physical translation data for logical addresses used by the instructions and remove logical to physical translation data for logical addresses not used by the instructions.

17. The non-volatile storage system of claim 15, wherein:
the means for receiving instructions is configured to receive, from a host system, code and logical to physical translation data for logical addresses used by the code;
the means for reallocating space is configured to add the logical to physical translation data received from the host system to the L2P cache; and
after the compute core performs the data manipulation operations, the means for reallocating space is further configured to update the L2P cache and report an update to the logical to physical translation data to the host system.

18. The non-volatile storage system of claim 1, wherein:
the controller is further configured to identify logical addresses in the logical to physical translation information stored in the local memory that is not used by the one or more data manipulation instructions; and
the controller is further configured to reduce space in the local memory by removing logical to physical translation information from the local memory for the logical addresses not used by the one or more data manipulation instructions.

19. The non-volatile storage system of claim 1, wherein:
the compute engine is further configured to perform the one or more data manipulation operations by searching through a set of data read from the non-volatile memory and stored in the working region in order to find a subset of the set of data that meets criteria identified in the one or more data manipulation operations.

* * * * *